US011956879B2

(12) United States Patent
Thorsen et al.

(10) Patent No.: US 11,956,879 B2
(45) Date of Patent: Apr. 9, 2024

(54) APPARATUS FOR HEATING SMOKABLE MATERIAL

(71) Applicant: NICOVENTURES TRADING LIMITED, London (GB)

(72) Inventors: Mitchel Thorsen, London (GB); Thomas Woodman, London (GB); Stephen Shannon, Eastbourne (GB)

(73) Assignee: NICOVENTURES TRADING LIMITED, London (GB)

(*) Notice: Subject to any disclaimer, the term of this patent is extended or adjusted under 35 U.S.C. 154(b) by 610 days.

(21) Appl. No.: 16/647,325

(22) PCT Filed: Sep. 17, 2018

(86) PCT No.: PCT/EP2018/075093
§ 371 (c)(1),
(2) Date: Mar. 13, 2020

(87) PCT Pub. No.: WO2019/053268
PCT Pub. Date: Mar. 21, 2019

(65) Prior Publication Data

US 2020/0268053 A1 Aug. 27, 2020

Related U.S. Application Data

(60) Provisional application No. 62/559,057, filed on Sep. 15, 2017, provisional application No. 62/609,799, filed on Dec. 22, 2017.

(51) Int. Cl.
*A24F 13/00* (2006.01)
*A24F 40/465* (2020.01)
(Continued)

(52) U.S. Cl.
CPC .......... *H05B 6/108* (2013.01); *A24F 40/465* (2020.01); *H05B 6/105* (2013.01); *H05B 6/44* (2013.01); *A24F 40/20* (2020.01)

(58) Field of Classification Search
CPC ...................................................... A24F 47/00
(Continued)

(56) References Cited

U.S. PATENT DOCUMENTS 2,592,554 A 4/1952 Suzuki et al.
2,860,638 A 11/1958 Sur et al.
(Continued)

FOREIGN PATENT DOCUMENTS

AU 2014369867 A1 6/2016
AU 2017289114 B2 4/2020
(Continued)

OTHER PUBLICATIONS

International Search Report and Written Opinion, Application No. PCT/EP2018/075093, dated Dec. 17, 2018, 11 pages.
(Continued)

*Primary Examiner* — Phuong K Dinh
(74) *Attorney, Agent, or Firm* — Husch Blackwell LLP

(57) ABSTRACT

Disclosed is an apparatus for heating smokable material to volatilize at least one component of the smokable material, the apparatus including a thermal insulator including an inner wall at least partially defining a heating zone for receiving at least a portion of an article including smokable material, wherein the inner wall includes heating material that is heatable by penetration with a varying magnetic field to heat the heating zone; an outer wall; and an insulation region bound by the inner wall and the outer wall, wherein the insulation region is evacuated to a lower pressure than an exterior of the insulation region; and a magnetic field generator for generating a varying magnetic field that penetrates the inner wall in order to heat the inner wall in use.

28 Claims, 10 Drawing Sheets

(51) Int. Cl.
*H05B 6/10* (2006.01)
*H05B 6/44* (2006.01)
*A24F 40/20* (2020.01)

(58) Field of Classification Search
USPC .................................................. 131/328–329
See application file for complete search history.

(56) References Cited

U.S. PATENT DOCUMENTS 3,065,756 A 11/1962 Wrenn et al.
3,144,174 A 8/1964 Nichols et al.
3,173,612 A 3/1965 Sharpe et al.
3,517,151 A 6/1970 Roumpos et al.
3,596,034 A 7/1971 Boyers
4,149,548 A 4/1979 Centanni et al.
4,913,168 A 4/1990 Sharpe
4,944,317 A 7/1990 Parks
5,093,894 A 3/1992 Yang
5,144,962 A 9/1992 Gard et al.
5,317,132 A 5/1994 Lee et al.
5,369,249 A 11/1994 Bowen et al.
5,613,505 A 3/1997 Williams et al.
5,649,554 A 7/1997 Oglesby et al.
6,053,176 A 4/2000 Zaffaroni et al.
6,632,407 B1 * 10/2003 Lau ....................... C01B 13/115
422/186
6,803,550 B2 10/2004 Shinozaki et al.
7,185,659 B2 3/2007 Kaljura et al.
7,185,959 B2 3/2007 Egoyants et al.
7,810,505 B2 10/2010 Suzuki et al.
8,459,271 B2 6/2013 Mironov et al.
8,807,140 B1 8/2014 Blandino et al.
8,910,640 B2 12/2014 Fursa et al.
9,357,803 B2 6/2016 Batista
9,554,598 B2 1/2017 Blandino et al.
9,710,921 B2 7/2017 Frank
9,980,512 B2 5/2018 Gut
10,058,123 B2 8/2018 Taluskie et al.
10,420,372 B2 9/2019 Mueller et al.
10,524,508 B2 1/2020 Yang
2002/0005207 A1 1/2002 Hodges et al.
2002/0078951 A1 6/2002 Conner et al.
2002/0078956 A1 6/2002 Matsen et al.
2003/0007887 A1 1/2003 Berthold et al.
2003/0102304 A1 6/2003 Li et al.
2003/0230567 A1 12/2003 Brosnan et al.
2004/0149297 A1 8/2004 Buryak et al.
2005/0025213 A1 2/2005 Matsumoto et al.
2005/0045193 A1 3/2005 Collett et al.
2007/0267409 A1 11/2007 Levitz et al.
2009/0120928 A1 5/2009 Ruscio et al.
2009/0151717 A1 6/2009 Saleem et al.
2009/0293888 A1 12/2009 Dubief et al.
2010/0024834 A1 2/2010 Crooks et al.
2010/0181387 A1 7/2010 Lord
2011/0240022 A1 10/2011 Cadieux et al.
2011/0271971 A1 11/2011 Hatrick et al.
2012/0145703 A1 6/2012 Shinkawa et al.
2012/0214926 A1 8/2012 Taluskie et al.
2012/0234315 A1 9/2012 Lim
2012/0305545 A1 12/2012 Mironov et al.
2013/0030125 A1 1/2013 Mironov et al.
2013/0133675 A1 5/2013 Demeritt et al.
2013/0160780 A1 6/2013 Malgat et al.
2014/0060554 A1 3/2014 Kaufman et al.
2014/0096782 A1 4/2014 Ampolini et al.
2014/0158144 A1 6/2014 Wilke et al.
2014/0216485 A1 8/2014 Blandino et al.
2014/0224267 A1 8/2014 Wilke et al.
2014/0301721 A1 10/2014 Blandino et al.
2015/0040925 A1 2/2015 Mironov et al.
2015/0181937 A1 7/2015 Egoyants et al.
2015/0201670 A1 7/2015 Kaufman et al.
2015/0201675 A1 7/2015 Blandino et al.
2015/0237913 A1 8/2015 Kaufman et al.
2015/0245669 A1 9/2015 Blandino et al.
2015/0272219 A1 10/2015 Blandino et al.
2015/0335062 A1 11/2015 Blandino et al.
2016/0007652 A1 1/2016 Gill et al.
2016/0012022 A1 1/2016 Cai
2016/0120221 A1 5/2016 Igumnov et al.
2016/0150825 A1 6/2016 Armoush et al.
2016/0192708 A1 7/2016 Mironov et al.
2016/0324215 A1 11/2016 Wilke et al.
2016/0331031 A1 11/2016 Wilke et al.
2017/0055574 A1 3/2017 Blandino et al.
2017/0055575 A1 3/2017 Kaufman et al.
2017/0055580 A1 3/2017 Blandino et al.
2017/0055581 A1 3/2017 Blandino et al.
2017/0055582 A1 3/2017 Blandino et al.
2017/0055583 A1 * 3/2017 Blandino ................. H05B 6/06
2017/0055584 A1 3/2017 Silvestrini
2017/0055585 A1 3/2017 Ballesteros et al.
2017/0071250 A1 3/2017 Wilke et al.
2017/0095006 A1 4/2017 Aoun
2017/0119046 A1 5/2017 Nicholson
2017/0119047 A1 5/2017 Blandino et al.
2017/0119048 A1 5/2017 Blandino et al.
2017/0119049 A1 5/2017 Aoun et al.
2017/0119050 A1 5/2017 Thorsen et al.
2017/0119051 A1 5/2017 Blandino et al.
2017/0156403 A1 6/2017 Abi Aoun et al.
2017/0174418 A1 6/2017 Blandino et al.
2017/0199048 A1 7/2017 Frankenburg
2017/0224015 A1 8/2017 Basil et al.
2017/0251718 A1 9/2017 Noel
2017/0325506 A1 11/2017 Henry
2018/0228217 A1 8/2018 Mekjean
2018/0235279 A1 8/2018 Mekjean
2018/0242633 A1 8/2018 Bradshaw
2018/0242636 A1 8/2018 Potter et al.
2018/0279677 A1 10/2018 Thal
2018/0317552 A1 11/2018 Deevi et al.
2018/0317553 A1 11/2018 Counts et al.
2018/0317555 A1 11/2018 Clough et al.
2018/0325173 A1 11/2018 Kwon
2018/0360123 A1 12/2018 Campbell et al.
2019/0159517 A1 5/2019 Sprinkel et al.
2019/0191780 A1 6/2019 Adams et al.
2019/0230988 A1 8/2019 Sharpe et al.
2019/0239555 A1 8/2019 Sharpe
2020/0054068 A1 2/2020 Inagaki
2020/0054069 A1 2/2020 Scatterday
2020/0229497 A1 7/2020 Sears et al.
2020/0268053 A1 8/2020 Egoyants et al.
2020/0288774 A1 9/2020 Egoyants et al.
2021/0100281 A1 4/2021 Wong et al.
2022/0015408 A1 1/2022 Collett et al.

FOREIGN PATENT DOCUMENTS

CA 2003521 A1 5/1990
CA 2003522 A1 5/1990
CA 2937722 A1 11/2015
CA 2974770 A1 12/2015
CA 2982164 A1 10/2016
CN 1126426 A 7/1996
CN 2393205 Y 8/2000
CN 2738167 Y 11/2005
CN 2924411 Y 7/2007
CN 101084801 A 12/2007
CN 201076006 Y 6/2008
CN 201088138 Y 7/2008
CN 101277623 A 10/2008
CN 101326138 A 12/2008
CN 101390659 A 3/2009
CN 201199922 Y 3/2009
CN 101951796 A 1/2011
CN 201762288 U 3/2011
CN 101326138 B 1/2013
CN 103202540 A 7/2013
CN 203369386 U 1/2014
CN 203435685 U 2/2014
CN 103689812 A 4/2014

(56) References Cited

FOREIGN PATENT DOCUMENTS

| | | | |
|---|---|---|---|
| CN | 203735483 | U | 7/2014 |
| CN | 103988576 | A | 8/2014 |
| CN | 203748687 | U | 8/2014 |
| CN | 203762288 | U | 8/2014 |
| CN | 104013109 | A | 9/2014 |
| CN | 104095291 | A | 10/2014 |
| CN | 104256899 | A | 1/2015 |
| CN | 204091003 | U | 1/2015 |
| CN | 104365175 | A | 2/2015 |
| CN | 104470387 | A | 3/2015 |
| CN | 104480800 | A | 4/2015 |
| CN | 104619202 | A | 5/2015 |
| CN | 104664608 | A | 6/2015 |
| CN | 104768407 | A | 7/2015 |
| CN | 204519366 | U | 8/2015 |
| CN | 204539505 | U | 8/2015 |
| CN | 204599333 | U | 9/2015 |
| CN | 104994757 | A | 10/2015 |
| CN | 105188425 | A | 12/2015 |
| CN | 105682488 | A | 6/2016 |
| CN | 104095291 | B | 1/2017 |
| EA | 009116 | B1 | 10/2007 |
| EP | 0430559 | A2 | 6/1991 |
| EP | 0430566 | A2 | 6/1991 |
| EP | 0488488 | A1 | 6/1992 |
| EP | 0703735 | A1 | 4/1996 |
| EP | 0703735 | B1 | 7/2001 |
| EP | 1357025 | A2 | 10/2003 |
| EP | 1454840 | A1 | 9/2004 |
| EP | 1454840 | B1 | 9/2006 |
| EP | 1940254 | A2 | 7/2008 |
| EP | 2059091 | A2 | 5/2009 |
| EP | 1357025 | B1 | 7/2009 |
| EP | 2186833 | A1 | 5/2010 |
| EP | 2316286 | A1 | 5/2011 |
| EP | 2327318 | A1 | 6/2011 |
| EP | 2444112 | A1 | 4/2012 |
| EP | 2253541 | B1 | 5/2012 |
| EP | 2460424 | A1 | 6/2012 |
| EP | 2903552 | A1 | 8/2015 |
| EP | 2907397 | A1 | 8/2015 |
| EP | 3367823 | A2 | 9/2018 |
| EP | 3542747 | A1 | 9/2019 |
| EP | 3632244 | A1 | 4/2020 |
| GB | 347650 | A | 4/1931 |
| GB | 2495923 | A | 5/2013 |
| GB | 2504732 | A | 2/2014 |
| GB | 2504733 | A | 2/2014 |
| JP | S457120 | Y1 | 4/1970 |
| JP | H03113366 | A | 5/1991 |
| JP | H0556298 | U | 7/1993 |
| JP | H07502188 | A | 3/1995 |
| JP | H0850422 | A | 2/1996 |
| JP | H0851175 | A | 2/1996 |
| JP | H08511175 | A | 11/1996 |
| JP | H09509845 | A | 10/1997 |
| JP | 2001174054 | A | 6/2001 |
| JP | 2002043047 | A | 2/2002 |
| JP | 2002144451 | A | 5/2002 |
| JP | 2002252078 | A | 9/2002 |
| JP | 2004121594 | A | 4/2004 |
| JP | 3588469 | B2 | 11/2004 |
| JP | 2004331191 | A | 11/2004 |
| JP | 2008050422 | A | 3/2008 |
| JP | 2008511175 | A | 4/2008 |
| JP | 2009087703 | A | 4/2009 |
| JP | 2010022754 | A | 2/2010 |
| JP | 2010050834 | A | 3/2010 |
| JP | 2010508034 | A | 3/2010 |
| JP | 2013013441 | A | 1/2013 |
| JP | 2013515465 | A | 5/2013 |
| JP | 2015524261 | A | 8/2015 |
| JP | 2015531601 | A | 11/2015 |
| JP | 2016508744 | A | 3/2016 |
| JP | 2016516402 | A | 6/2016 |
| JP | 2016538842 | A | 12/2016 |
| JP | 6077145 | B2 | 2/2017 |
| JP | 2017515490 | A | 6/2017 |
| JP | 2020512487 | A | 4/2020 |
| JP | 6875044 | B2 | 5/2021 |
| JP | 6933323 | B2 | 9/2021 |
| JP | 7105289 | B2 | 7/2022 |
| KR | 880701636 | A | 11/1988 |
| KR | 100385395 | B1 | 8/2003 |
| KR | 100449444 | B1 | 8/2005 |
| KR | 20100108565 | A | 10/2010 |
| KR | 20130029697 | A | 3/2013 |
| KR | 20140093659 | A | 7/2014 |
| KR | 20150027069 | A | 3/2015 |
| KR | 20150040012 | A | 4/2015 |
| KR | 20150047616 | A | 5/2015 |
| KR | 20150132112 | A | 11/2015 |
| KR | 20150143877 | A | 12/2015 |
| KR | 20160064159 | A | 6/2016 |
| KR | 20170008209 | A | 1/2017 |
| RU | 2132629 | C1 | 7/1999 |
| RU | 2135054 | C1 | 8/1999 |
| RU | 103281 | U1 | 4/2011 |
| RU | 2425608 | C2 | 8/2011 |
| RU | 2509516 | C2 | 3/2014 |
| RU | 2531890 | C2 | 10/2014 |
| RU | 2015106592 | A | 11/2016 |
| RU | 2682772 | C1 | 3/2019 |
| UA | 125609 | C2 | 5/2022 |
| WO | 8404698 | A1 | 12/1984 |
| WO | 9409842 | A1 | 5/1994 |
| WO | 9527411 | A1 | 10/1995 |
| WO | 9527412 | A1 | 10/1995 |
| WO | 9618662 | A1 | 6/1996 |
| WO | 02089532 | A1 | 11/2002 |
| WO | 02098389 | A1 | 12/2002 |
| WO | 2007051163 | A2 | 5/2007 |
| WO | 2008015441 | A1 | 2/2008 |
| WO | 2009079641 | A2 | 6/2009 |
| WO | 2010113702 | A1 | 10/2010 |
| WO | 2010133342 | A1 | 11/2010 |
| WO | 2011130414 | A1 | 10/2011 |
| WO | 2012134117 | A2 | 10/2012 |
| WO | 2012164009 | A2 | 12/2012 |
| WO | 2013034459 | A1 | 3/2013 |
| WO | 2013098395 | A1 | 7/2013 |
| WO | 2013098409 | A1 | 7/2013 |
| WO | 2013131763 | A1 | 9/2013 |
| WO | WO 2013131764 | | 9/2013 |
| WO | 2013144324 | A1 | 10/2013 |
| WO | 2013178766 | A1 | 12/2013 |
| WO | 2014023965 | A1 | 2/2014 |
| WO | 2014023967 | A1 | 2/2014 |
| WO | 2014048745 | A1 | 4/2014 |
| WO | 2014054035 | A1 | 4/2014 |
| WO | 2014061477 | A1 | 4/2014 |
| WO | 2014102092 | A1 | 7/2014 |
| WO | 2014104078 | A1 | 7/2014 |
| WO | 2014139611 | A1 | 9/2014 |
| WO | 2014140320 | A1 | 9/2014 |
| WO | 2015019101 | A1 | 2/2015 |
| WO | 2015062983 | A2 | 5/2015 |
| WO | 2015071682 | A1 | 5/2015 |
| WO | 2015082648 | A1 | 6/2015 |
| WO | 2015082649 | A1 | 6/2015 |
| WO | 2015082651 | A1 | 6/2015 |
| WO | 2015082652 | A1 | 6/2015 |
| WO | 2015082653 | A1 | 6/2015 |
| WO | 2015100361 | A1 | 7/2015 |
| WO | 2015101479 | A1 | 7/2015 |
| WO | 2015116934 | A1 | 8/2015 |
| WO | 2015117702 | A1 | 8/2015 |
| WO | 2015131058 | A1 | 9/2015 |
| WO | 2015155289 | A1 | 10/2015 |
| WO | 2015166245 | A2 | 11/2015 |
| WO | 2015175568 | A1 | 11/2015 |
| WO | 2015176898 | A1 | 11/2015 |
| WO | 2015177043 | A1 | 11/2015 |
| WO | 2015177044 | A1 | 11/2015 |

(56) References Cited

FOREIGN PATENT DOCUMENTS

| | | | |
|---|---|---|---|
| WO | 2015177045 | A1 | 11/2015 |
| WO | 2015177046 | A1 | 11/2015 |
| WO | 2015177247 | A1 | 11/2015 |
| WO | 2015177255 | A1 | 11/2015 |
| WO | 2015177257 | A1 | 11/2015 |
| WO | 2015177264 | A1 | 11/2015 |
| WO | 2015177294 | A1 | 11/2015 |
| WO | WO 2015177253 | | 11/2015 |
| WO | 2015197863 | A1 | 12/2015 |
| WO | 2015198015 | A1 | 12/2015 |
| WO | 2016023965 | A1 | 2/2016 |
| WO | 2016075426 | A1 | 5/2016 |
| WO | 2016075436 | A1 | 5/2016 |
| WO | 2016088037 | A1 | 6/2016 |
| WO | 2016096865 | A2 | 6/2016 |
| WO | 2016162446 | A1 | 10/2016 |
| WO | WO 2016207407 | | 12/2016 |
| WO | 2017005705 | A1 | 1/2017 |
| WO | 2017029269 | A1 | 2/2017 |
| WO | 2017036950 | A2 | 3/2017 |
| WO | 2017036951 | A1 | 3/2017 |
| WO | 2017036954 | A1 | 3/2017 |
| WO | 2017036955 | A2 | 3/2017 |
| WO | 2017036957 | A1 | 3/2017 |
| WO | 2017036958 | A2 | 3/2017 |
| WO | 2017036959 | A1 | 3/2017 |
| WO | 2017036958 | A3 | 4/2017 |
| WO | WO 2017068098 | | 4/2017 |
| WO | 2017072145 | A1 | 5/2017 |
| WO | 2017072146 | A1 | 5/2017 |
| WO | 2017072147 | A2 | 5/2017 |
| WO | 2017072148 | A1 | 5/2017 |
| WO | 2017072147 | A3 | 7/2017 |
| WO | 2017167932 | A1 | 10/2017 |

OTHER PUBLICATIONS

Examination Report No. 1 for Australian Patent Application No. 2018334042 dated Dec. 16, 2020, 4 pages.
International Preliminary Report on Patentability for Application No. PCT/EP2018/075093, dated Mar. 26, 2020, 8 pages.
Office Action and Search Report for Chinese Application No. 201880059756, dated Jan. 14, 2022, 11 pages.
Office action for Brazilian Application No. 112020005010-5, dated Jul. 21, 2022, 4 pages.
Office Action for Chinese Application No. 201880059756.X, dated Sep. 23, 2022, 6 pages.
Office action for Korean Application No. 10-2020-7007392, dated Sep. 26, 2022, 15 Pages.
Aoun, Abi, Application and File History for U.S. Appl. No. 15/733,194, filed Jun. 8, 2020.
Aoun, Abi, Application and File History for U.S. Appl. No. 16/311,405, filed Dec. 19, 2018.
Aoun, Abi, Application and File History for U.S. Appl. No. 16/311,411, filed Dec. 19, 2018.
Aoun, Abi, Application and File History for U.S. Appl. No. 16/311,418, filed Dec. 19, 2018.
Australian Examination Report for AU Application No. 2016313708, dated Nov. 1, 2019, 7 Pages.
Australian Examination Report, Application No. 2016313708, dated Nov. 23, 2018, 6 Pages.
Blandino, et al., Application and File History for U.S. Appl. No. 14/927,532, filed Oct. 30, 2015.
Blandino, et al., Application and File History for U.S. Appl. No. 14/927,539, filed Oct. 30, 2015.
Blandino, et al., Application and File History for U.S. Appl. No. 14/927,551, filed Oct. 30, 2015.
Blandino, et al., Application and File History for U.S. Appl. No. 14/927,556, filed Oct. 30, 2015, 60 Pages.
Blandino, et al., Application and File History for U.S. Appl. No. 16/946,043, filed Jun. 3, 2020.
Blandino, Thomas P.., Application and File History for U.S. Appl. No. 15/772,394, filed Apr. 30, 2018.
Blandino, Thomas P.., Application and File History for U.S. Appl. No. 15/754,834, filed Feb. 23, 2018.
Blandino, Thomas P.., Application and File History for U.S. Appl. No. 15/772,396, filed Apr. 30, 2018.
Blandino, Thomas P.., Application and File History for U.S. Appl. No. 15/772,399, filed Apr. 30, 2018.
Brazilian Office Action for BR Application No. BR1120180085138, dated Dec. 11, 2019, 6 pages (2 pages of English Translation and 4 pages of Official Copy).
Canadian Office Action for CA Application No. 3003521, dated Dec. 9, 2019, 6 Pages.
Canadian Office Action, Application No. 2,996,341, dated Mar. 1, 2019, 4 Pages.
Canadian Office Action, Application No. 3,003,520, dated Mar. 28, 2019, 3 Pages.
Chinese Office Action for CN Application No. 201680049091.5, dated Dec. 27, 2019, 25 pages (12 pages of English Translation and 13 pages of Official Copy).
Chinese Office Action, Application No. 201680049091.5, dated Aug. 14, 2020, 8 Pages (English Translation Only).
Communication pursuant to Article 94(3) EPC for Application No. 16798648.8, dated Nov. 19, 2020, 9 Pages.
Communication pursuant to Article 94(3) EPC for Application No. 17740628.7 dated May 9, 2022, 9 Pages.
Communication pursuant to Article 94(3) EPC for Application No. 17740631.1 dated Oct. 18, 2022, 6 Pages.
Decision to Grant a Patent dated Mar. 15, 2022 for Japanese Application No. 2020-183062, 5 pages (2 pages of English Translation and 3 pages of Official Copy).
European Office Action for Application No. 21213373.0, dated May 9, 2022, 6 Pages.
European Search Report for Application No. 21213373.0, dated Apr. 26, 2022, 7 Pages.
European Search Report for European Application No. 20205063.9, dated Feb. 18, 2021, 13 Pages.
Examination Report dated Sep. 6, 2019 for Australian Application No. 2017289114, 7 Pages.
Extended European Search Report for Application No. 20202666.2, dated Feb. 19, 2021, 14 Pages.
Extended European Search Report for Application No. 20204770.0, dated Jun. 30, 2021, 14 Pages.
Extended European Search Report for Application No. 20205060.5, dated Mar. 2, 2021, 19 Pages.
Extended European Search Report for Application No. 20205060.5, dated Aug. 6, 2021, 20 Pages.
Extended European Search Report for Application No. 20205065.4, dated Mar. 10, 2021, 14 Pages.
Extended European Search Report for Application No. EP20205306.2, dated Feb. 19, 2021, 12 Pages.
First Office Action and Search Report dated Mar. 4, 2020 for Chinese Application No. 201680077608.1 filed Oct. 26, 2016, 18 pages (10 pages of English Translation and 8 pages of Official Copy).
International Preliminary Report on Patentability for Application No. PCT/EP2016/075735, dated Jan. 2, 2018, 8 Pages.
International Preliminary Report on Patentability for Application No. PCT/EP2016/075736, dated May 11, 2018, 6 Pages.
International Preliminary Report on Patentability for Application No. PCT/EP2016/075737, dated May 11, 2018, 10 Pages.
International Preliminary Report on Patentability for Application No. PCT/EP2016/075738, dated May 11, 2018, 9 Pages.
International Preliminary Report on Patentability for Application No. PCT/EP2017/065906, dated Jan. 10, 2019, 9 Pages.
International Preliminary Report on Patentability for Application No. PCT/EP2017/065908, dated Jan. 10, 2019, 9 Pages.
International Preliminary Report on Patentability for Application No. PCT/EP2017/065909, dated Jan. 10, 2019, 7 Pages.
International Preliminary Report on Patentability received for PCT Patent Application No. PCT/EP2016/070190, dated Mar. 15, 2018, 12 Pages.

(56) References Cited

OTHER PUBLICATIONS

International Preliminary Report on Patentability received for PCT Patent Application No. PCT/EP2021/075735, dated Apr. 13, 2023, 11 pages.
International Search Report and Written Opinion for Application No. PCT/EP2017/065906, dated Oct. 24, 2017, 13 Pages.
International Search Report and Written Opinion for Application No. PCT/EP2017/065908, dated Oct. 17, 2017, 12 Pages.
International Search Report and Written Opinion for Application No. PCT/EP2017/065909, dated Oct. 24, 2017, 11 Pages.
International Search Report and Written Opinion received for PCT Patent Application No. PCT/EP2016/070190, dated Mar. 13, 2017, 19 pages.
International Search Report and Written Opinion received for PCT Patent Application No. PCT/EP2016/075736, dated Feb. 14, 2017, 8 pages.
International Search Report and Written Opinion received for PCT Patent Application No. PCT/EP2018/058195 dated Nov. 12, 2018, 17 Pages.
International Search Report and Written Opinion received for PCT Patent Application No. PCT/EP2021/075735, dated Jan. 5, 2022, 17 pages.
International Search Report and Written Opinion received for PCT Patent Application No. PCT/EP2016/075737, dated Jun. 16, 2017, 17 Pages.
International Search Report and Written Opinion, Application No. PCT/EP2016/075735, dated Feb. 2, 2017, 9 Pages.
International Search Report and Written Opinion, Application No. PCT/EP2016/075738, daed Mar. 2, 2017, 13 Pages.
International Search Report for Application No. PCT/EP2018/083795, dated Mar. 15, 2019, 3 Pages.
Iorga, Alexandru, et al., "Low Curie Temperature in Fe—Cr—Ni—Mn Alloys", U.P.B. Sci.Bull., Series B, vol. 73, Iss.4, 2011, pp. 195-202 (8 Pages).
Japanese Office Action for JP Application No. 2018-507621, dated Feb. 4, 2020, 29 Pages (15 Pages of English Translation and 14 Pages of Official Copy).
Japanese Office Action, Application No. 2018-507621, dated May 7, 2019, 8 Pages (English Translation Only).
Japanese Office Action, Application No. 2018-519932, dated Jun. 25, 2019, 5 Pages (English Translation Only).
Japanese Office Action, Application No. 2018-521546, dated Jun. 25, 2019, 8 pages (4 pages of English Translation and 4 pages of Official Copy).
Japanese Office Action, Application No. 2018-521928, dated Jul. 23, 2019, 14 pages (7 pages of English Translation and 7 pages of Official Copy).
Japanese Office Action, Application No. 2018-522061, dated Jul. 23, 2019, 9 pages (4 pages of English Translation and 5 pages of Official Copy).
Kaufman, Duane A., Application and File History for U.S. Appl. No. 15/772,391, filed Apr. 30, 2018.
Kaufman, et al., Application and File History for U.S. Appl. No. 14/840,897, filed Aug. 31, 2015.
Kaufman, et al., Application and File History for U.S. Appl. No. 14/927,529, filed Oct. 30, 2015.
Kaufman, et al., Application and File History for U.S. Appl. No. 14/927,537, filed Oct. 30, 2015.
Kaufman, et al., Application and File History for U.S. Appl. No. 16/947,215, filed Jul. 23, 2020.
Korean Office Action, Application No. 10-2018-7006076, dated Feb. 7, 2019, 10 Pages (English Translation Only).
Korean Office Action, Application No. 10-2018-7012353, dated Sep. 26, 2019, 14 pages (8 pages of English Translation and 6 pages of Official Copy).
Korean Office Action, Application No. 10-2018-7012366, dated Mar. 29, 2019, 12 pages (6 pages of English Translation and 6 pages of Official Copy).
Korean Office Action, Application No. 10-2018-7012422, dated Mar. 22, 2019, 19 pages (10 pages of Official Copy and 9 pages of English Translation).
Korean Office Action, Application No. 10-2018-7012428, dated Mar. 22, 2019, 15 pages (8 pages of English Translation and 7 pages of Official Copy).
"NeoMax MS-135", from NeoMax Materials Co. Ltd., described at the following URL: http://www.neomax-materials.co.jp/eng/pr0510.htm, Oct. 30, 2015, 2 pages.
Notice of Opposition dated Jun. 3, 2020 for European Application No. 16766494.5, 37 Pages.
Notice of Reasons For Refusal Office Action dated Sep. 8, 2020 for Japanese Application No. 2018-567856, 8 pages (4 pages of English Translation and 4 pages of Official Copy).
Notice of Reasons for Refusal received for Japanese Patent Application No. 2022-048457, dated Jan. 31, 2023, 15 pages (8 pages of English Translation and 7 pages of Official Copy).
Notice of Reasons For Rejection Office Action dated Mar. 17, 2020 for Japanese Application No. 2018-522061, 7 Pages (3 Pages of English Translation and 4 Pages of Official Copy).
Notice of Reasons for Rejection received for Japanese Patent Application No. 2020-528003, dated Jul. 20, 2021, 3 Pages (English Translation Only).
Notice of Reasons of Refusal received for Japanese Patent Application No. 2020-191838, dated Jul. 5, 2022, 6 pages (3 pages of English Translation and 3 pages of Official Copy).
Notification of Reason for Refusal dated Jan. 3, 2022 for Korean Application No. 10-2020-7018918, 12 pages (6 pages of English Translation and 6 pages of Official Copy).
Office Action and Search Report for Russian Application No. 2020134245, dated Jan. 19, 2022, 27 pages (16 pages of English Translation and 11 pages of Official Copy).
Office Action and Search Report dated Apr. 14, 2020 for Chinese Application No. 201680063711.0, 28 pages (14 pages of English Translation and 14 pages of Official Copy).
Office Action and Search Report dated Jan. 18, 2022 for Russian Application No. 2020134241, 22 pages (11 pages of English Translation and 11 pages of Official Copy).
Office Action dated Jun. 1, 2021, for Russian Application No. 2020135859, 12 pages (7 pages of English Translation and 5 pages of Official Copy).
Office Action dated Jun. 17, 2021 for Ukraine Application No. a201804590, 3 pages (Official Copy Only).
Office Action for Brazilian Application No. 112018077348-4, dated Sep. 27, 2021, 4 pages (Official Copy Only).
Office Action For Canadian Application No. 3,003,519, dated Jul. 30, 2021, 4 Pages.
Office Action For Canadian Application No. 3,056,677, dated Nov. 24, 2020, 6 Pages.
Office Action For Chinese Application No. 201680072882.X, dated Jan. 14, 2021, 12 pages (6 pages of English Translation and 6 pages of Official Copy).
Office Action For Chinese Application No. 201680072882.X, dated Sep. 1, 2021, 17 pages (9 pages of English Translation and 8 pages of Official Copy).
Office Action for Chinese Application No. 201780039879.2 dated Sep. 18, 2020, 7 pages (Official Copy Only).
Office Action for Chinese Application No. 201780040300.4, dated Apr. 26, 2022, 9 pages (3 pages of English Translation and 6 pages of Official Copy).
Office Action For Chinese Application No. 201780040300.4, dated Nov. 15, 2021, 14 pages (7 pages of English Translation and 7 pages of Official Copy).
Office Action For Japanese Application No. 2020-093539, dated Apr. 6, 2021, 6 pages (3 pages of English Translation and 3 pages of Official Copy).
Office Action For Japanese Application No. 2020-175420, dated Oct. 12, 2021, 9 pages (5 pages of English Translation and 4 pages of Official Copy).
Office Action For Japanese Application No. 2020-182740, dated Oct. 12, 2021, 10 pages (5 pages of English Translation and 5 pages of Official Copy).

(56) References Cited

OTHER PUBLICATIONS

Office Action For Japanese Application No. 2020-182750, dated Oct. 12, 2021, 8 pages (4 pages of English Translation and 4 pages of Official Copy).
Office Action For Japanese Application No. 2020-183062, dated Nov. 30, 2021, 6 pages (3 pages of English Translation and 3 pages of Official Copy).
Office Action For Japanese Application No. 2020-191836, dated Oct. 26, 2021, 8 pages (4 pages of English Translation and 4 pages of Official Copy).
Office Action For Japanese Application No. 2020-191838, dated Oct. 26, 2021, 9 pages (4 pages of English Translation and 5 pages of Official Copy).
Office Action for Japanese Application No. 2022-010005, dated Mar. 15, 2022, 5 pages (2 pages of English Translation and 3 pages of Official Copy).
Office Action For Korean Application No. 10-2018-7037677, dated May 12, 2021, 4 pages (2 pages of English Translation and 2 pages of Official Copy).
Office Action For Korean Application No. 10-2018-7037677, dated Mar. 29, 2021, 5 pages (3 pages of English Translation and 2 pages of Official Copy).
Office Action for Korean Application No. 10-2020-7011369, dated May 10, 2022, 18 pages (9 pages of English Translation and 9 pages of Official Copy).
Office action for Korean Application No. 10-2020-7018918, dated Jul. 27, 2022, 6 pages (3 pages of English Translation and 3 pages of Official Copy).
Office Action For Korean Application No. 10-2021-7018056, dated Oct. 27, 2021, 21 pages (12 pages of English Translation and 9 pages of Official Copy).
Office Action For Korean Application No. 10-2021-7023346, dated Dec. 14, 2021, 40 pages (22 pages of English Translation and 18 pages of Official Copy).
Office Action for Malaysian Application No. PI2018002742, dated Apr. 21, 2021, 4 pages (English Translation Only).
Office Action For Russian Application No. 2020135808, dated Apr. 23, 2021, 12 pages (5 pages of English Translation and 7 pages of Official Copy).
Office Action For Russian Application No. 2020135851, dated May 24, 2021, 13 pages (Official Copy Only).
Office Action for Ukrainian Application No. a201813017, dated May 6, 2022, 3 pages (Official Copy Only).
Office Action dated Sep. 9, 2020 for Chinese Application No. 201780040874.1, 20 pages (11 pages of English Translation and 9 pages of Official Copy).
Office Action dated May 12, 2021 for Chinese Application No. 201780040874.1, 15 pages (8 pages of English Translation and 7 pages of Official Copy).
Office Action dated May 12, 2021 for Korean Application No. 10-2018-7037693, 6 pages (3 pages of English Translation and 3 pages of Official Copy).
Office Action date Sep. 15, 2020 for Japanese Application No. 2018-567854, 8 pages (4 pages of English Translation and 4 pages of Official Copy).
Office Action dated Feb. 16, 2021 for Japanese Application No. 2018-567856, 2 pages (English Translation Only).
Office Action dated Aug. 19, 2020 for KR Application No. 10-2018-7037693, filed Jun. 27, 2017, 21 pages (11 pages of English Translation and 10 pages of Official Copy).
Office Action dated Mar. 2, 2021 for Japanese Application No. 2018-567947, 4 pages (English Translation Only).
Office Action dated Jun. 22, 2022 for Russian Application No. 2019107295, 8 pages (2 pages of English Translation and 6 pages of Official Copy).
Office Action dated Feb. 25, 2020 for Japanese Application No. 2018-567854, 7 Pages (3 Pages of English Translation and 4 Pages of Official Copy).
Office Action dated Feb. 25, 2020 for Japanese Application No. 2018-567947, 6 pages (3 pages of English Translation and 3 pages of Official Copy).
Office Action dated Feb. 25, 2020 for Japanese Appliication No. 2018-567856, 6 pages (3 pages of English Translation and 3 pages of Official Copy).
Office Action dated Apr. 29, 2021, for Malaysian Application No. PI2018701525, 3 pages (English Translation Only).
Office Action received for Australian Patent Application No. 2022200981, dated Dec. 15, 2022, 3 pages.
Office Action received for Brazilian Patent Application No. 112018077348-4, dated Oct. 25, 2022, 1 page (Official Copy Only).
Office Action received for Brazilian Patent Application No. 112018077348-4, dated Sep. 2, 2022, 5 pages (Official Copy Only).
Office Action received for European Patent Application No. 16798649.6, dated Jan. 3, 2022, 7 pages.
Office Action received for European Patent Application No. 16798649.6, dated Jul. 5, 2021, 6 Pages.
Office Action received for European Patent Application No. 16798649.6, dated May 25. 2022, 5 pages.
Office Action received for European Patent Application No. 16798650.4, dated Mar. 6, 2020, 4 pages.
Office Action received for Korean Patent Application No. 10-2022-7025860, dated Feb. 15, 2023, 18 pages (10 pages of English Translation and 8 pages of Official Copy).
Result of Consultation received for European Patent Application No. 16798650.4, dated Feb. 8, 2022, 4 pages.
Russian Office Action, Application No. 2018115542, dated Oct. 29, 2018, 9 pages (3 pages of English Translation and 6 pages of Official Copy).
Thorsen, et al., Application and File History for U.S. Appl. No. 16/647,325, filed Mar. 13, 2020.
Todaka, et al., "Low Curie Temperature Material for Induction Heating Self-Temperature Controlling System", Journal of Magnetism and Magnetic Materials 320, 2008, pp. e702-e707 (6 Pages).
"Decision of Refusal received for Japanese Patent Application No. 2020-191838, dated Feb. 28, 2023", 6 pages (3 pages of English Translation and 3 pages of Official Copy).
"Extended Search Report received for European Patent Application No. 22166210.9, dated Oct. 31, 2022", 11 pages.
"International Preliminary Report on Patentability received for PCT Patent Application No. PCT/EP2018/083795, dated Jun. 18, 2020", 8 pages.
"Notice of Reasons for Refusal received for Japanese Patent Application No. 2022-011143, dated Mar. 28, 2023", 12 pages (6 pages of English Translation and 6 pages of Official Copy).
"Notice of Reasons for Rejection for Japanese Application No. 2022-139703, dated Jul. 25, 2023", 6 pages. (3 pages of English Translation and 3 pages of Official Copy).
"Office Action received for Brazilian Patent Application No. 122022011678-7, dated Mar. 7, 2023", 10 pages (Official Copy Only).
"Office Action received for European Patent Application No. 20202666.2, dated Jul. 6, 2023", 8 pages.
"Office Action received for European Patent Application No. 20205060.5, dated Jul. 28, 2023", 8 pages.
"Office Action received for Korean Patent Application No. 10-2020-7018748, dated Jun. 28, 2023", 14 pages (8 pages of English Translation and 6 pages of Official Copy).
"Reason for Rejection received for Korean Patent Application No. 10-2022-7025860, dated Aug. 11, 2023", 21 pages (12 pages of English Translation and 9 pages of Official Copy Only).
"Reasons for Refusal received for Japanese Patent Application No. 2022-111113, dated Aug. 29, 2023", 6 pages (3 pages of English Translation and 3 pages of Official Copy).

* cited by examiner

Section A-A

Section B-B

APPARATUS FOR HEATING SMOKABLE MATERIAL

TECHNICAL FIELD

The present invention relates to apparatus for heating smokable material to volatilise at least one component of the smokable material, to systems comprising such apparatus and articles comprising smokable material, and to methods of heating smokable material to volatilise at least one component of the smokable material.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present invention provides apparatus for heating smokable material to volatilise at least one component of the smokable material, the apparatus comprising:

a thermal insulator comprising:

an inner wall at least partially defining a heating zone for receiving at least a portion of an article comprising smokable material, wherein the inner wall comprises heating material that is heatable by penetration with a varying magnetic field to heat the heating zone;

an outer wall; and an insulation region bound by the inner wall and the outer wall, wherein the insulation region is evacuated to a lower pressure than an exterior of the insulation region; and a magnetic field generator for generating a varying magnetic field that penetrates the inner wall in order to heat the inner wall in use.

In an exemplary embodiment, the outer wall is magnetically impermeable and/or electrically non-conductive.

In an exemplary embodiment, the outer wall comprises glass or ceramic.

In an exemplary embodiment, the magnetic field generator comprises a coil that encircles at least part of the outer wall. The coil may comprise a helical coil. The coil may comprise a Litz wire.

In an exemplary embodiment, the coil comprises a first part to heat a first section of the inner wall and a second part to heat a second section of the inner wall, and the first part and the second part are independently controllable.

In an exemplary embodiment, the apparatus comprises a second coil that encircles at least part of the outer wall, and the coil and the second coil are independently controllable.

In an exemplary embodiment, the apparatus comprises braze rings located at a junction between the inner wall and the outer wall to seal the insulation region.

In an exemplary embodiment, the outer wall extends only partially along a length of the inner wall.

In an exemplary embodiment, the inner wall is a cylindrical tube.

In an exemplary embodiment, the apparatus comprises magnetic shielding surrounding the magnetic field generator.

In an exemplary embodiment, the heating material comprises one or more materials selected from the group consisting of: an electrically-conductive material, a magnetic material, and a magnetic electrically-conductive material.

In an exemplary embodiment, wherein the heating material comprises a metal or a metal alloy.

In an exemplary embodiment, the heating material comprises one or more materials selected from the group consisting of: aluminium, gold, iron, nickel, cobalt, conductive carbon, graphite, plain-carbon steel, stainless steel, ferritic stainless steel, copper, and bronze.

In an exemplary embodiment, a first section of the inner wall is made of a first material and a second section of the inner wall is made of a second material that is different from the first material.

In an exemplary embodiment, the apparatus is for heating non-liquid smokable material to volatilise at least one component of the smokable material.

In an exemplary embodiment, the apparatus is for heating smokable material to volatilise at least one component of the smokable material without burning the smokable material.

In an exemplary embodiment, the inner wall is connected to the outer wall at a first position on the inner wall and at a second position on the inner wall, and the inner wall comprises at least one deformable structure between the first and second positions for deforming to accommodate thermal expansion of a section of the inner wall between the first and second positions during heating of the heating material. The thermal expansion may be or comprise axial thermal expansion of the section of the inner wall. The inner wall may comprise two such deformable structures that are spaced apart in the axial direction of the inner wall. In an exemplary embodiment, the inner wall is a cylindrical tube, and the thermal expansion is or comprises axial thermal expansion of a section of the cylindrical tube.

In an exemplary embodiment, the heating material comprises a metallized layer of the inner wall.

In an exemplary embodiment, the inner wall comprises a support of magnetically impermeable and/or electrically non-conductive material and the metallized layer is between the support and the insulation region.

In an exemplary embodiment, the inner wall comprises a support of magnetically impermeable and/or electrically non-conductive material and the support is between the metallized layer and the insulation region.

A second aspect of the present invention provides apparatus for heating smokable material to volatilise at least one component of the smokable material, the apparatus comprising:

a heating zone for receiving at least a portion of an article comprising smokable material;

a heating element comprising heating material that is heatable by penetration with a varying magnetic field to heat the heating zone;

a thermal insulator comprising:

an outer wall;

an inner wall between the heating element and the outer wall; and an insulation region bound by the inner wall and the outer wall, wherein the insulating region is evacuated to a lower pressure than an exterior of the insulating region, and wherein one or each of the inner and outer walls is magnetically impermeable and/or electrically non-conductive; and a magnetic field generator for generating a varying magnetic field that penetrates the heating element in use.

Exemplary embodiments of the apparatus of the second aspect may have any of the features noted above as being present in exemplary embodiments of the apparatus of the first aspect of the present invention.

In an exemplary embodiment, one or each of the outer wall and the inner wall is formed of glass.

In an exemplary embodiment, the heating element is connected to the inner wall by one or more deformable attachments.

A third aspect of the present invention provides smokable material for use with the apparatus of the first aspect or the second aspect of the present invention.

The smokable material of the third aspect of the present invention may be non-liquid smokable material.

A fourth aspect of the present invention provides an article comprising smokable material, wherein the article is for use with the apparatus of the first aspect or the second aspect of the present invention.

A fifth aspect of the present invention provides a system for heating smokable material to volatilise at least one component of the smokable material, the system comprising:

apparatus according to the first aspect or the second aspect of the present invention; and the article comprising smokable material for locating at least partially in the heating zone of the apparatus.

A sixth aspect of the present invention provides a method of heating smokable material to volatilise at least one component of the smokable material, the method comprising:

providing an apparatus according to the first aspect or the second aspect of the present invention;

locating at least a portion of an article comprising smokable material in the heating zone of the apparatus; and penetrating the heating material of the apparatus with a varying magnetic field to heat the heating zone and the smokable material.

A seventh aspect of the present invention provides a thermal insulator for use in apparatus for heating smokable material to volatilise at least one component of the smokable material, the thermal insulator comprising:

an inner wall comprising heating material that is heatable by penetration with a varying magnetic field;

an outer wall that is magnetically impermeable and/or electrically non-conductive; and an insulation region bound by the inner wall and the outer wall, wherein the insulation region is evacuated to a lower pressure than an exterior of the insulation region.

Exemplary embodiments of the thermal insulator of the seventh aspect may have any of the features noted above as being present in exemplary embodiments of the thermal insulator of the apparatus of the first aspect of the present invention.

In an exemplary embodiment, the insulation region encircles the inner wall, and the outer wall encircles the insulation region.

In an exemplary embodiment, the thermal insulator is for use in the apparatus of the first aspect or the second aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
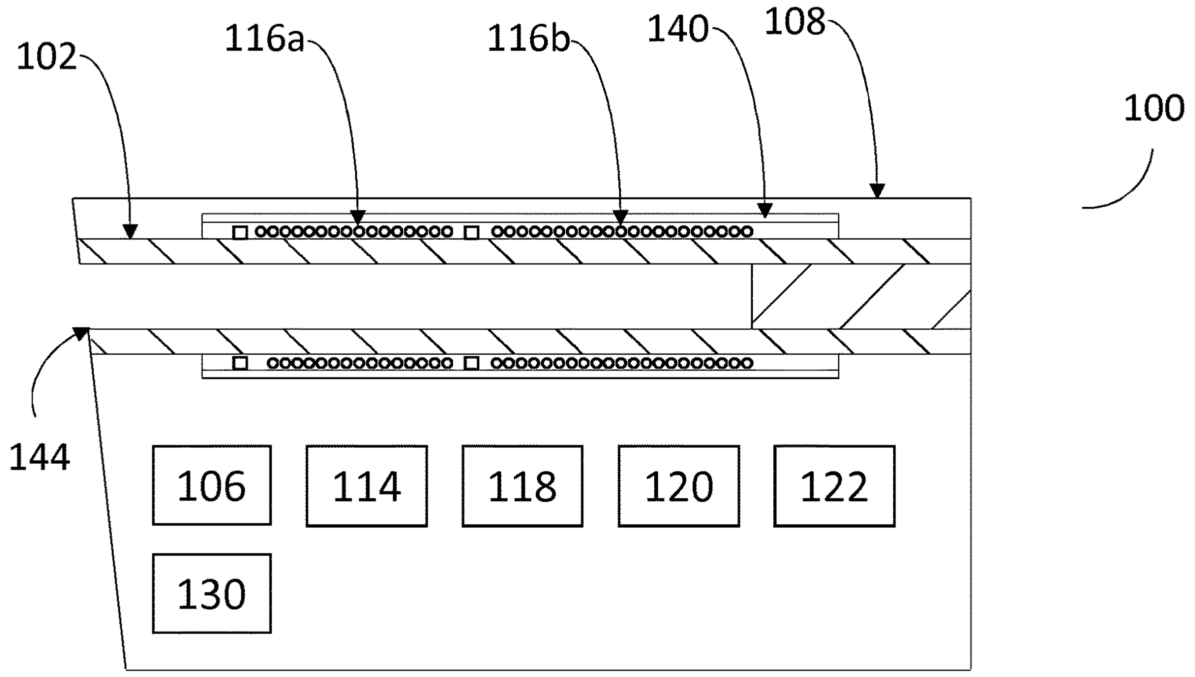
FIG. 1 shows a schematic cross-sectional view of an example apparatus for heating smokable material to volatilise at least one component of the smokable material.

As used herein, the term "smokable material" includes materials that provide volatilised components upon heating, typically in the form of vapour or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenised tobacco or tobacco substitutes. The smokable material can be in the form of ground tobacco, cut rag tobacco, extruded tobacco, reconstituted tobacco, reconstituted smokable material, liquid, gel, gelled sheet, powder, or agglomerates, or the like. "Smokable material" also may include other, non-tobacco, products, which, depending on the product, may or may not contain nicotine. "Smokable material" may comprise one or more humectants, such as glycerol or propylene glycol.

As used herein, the term "heating material" or "heater material" refers to material that is heatable by penetration with a varying magnetic field.

As used herein, the terms "flavour" and "flavourant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavour enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may comprise natural or nature-identical aroma chemicals. They may be in any suitable form, for example, oil, liquid, powder, or gel.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule and magnetic hysteresis heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 2:
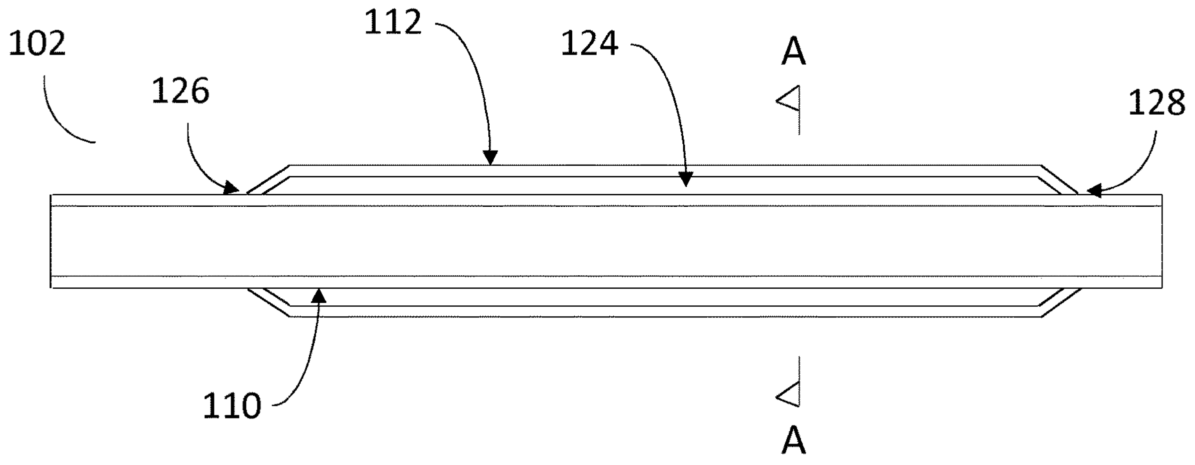
FIG. 2 shows a schematic cross-sectional view of a thermal insulator of the apparatus of FIG. 1.
Figure 3:
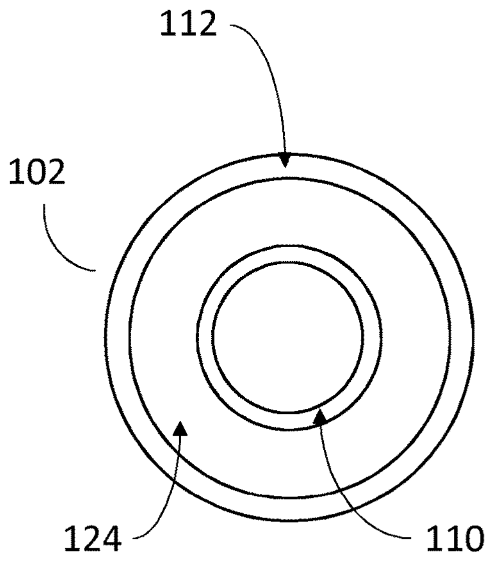
FIG. 3 shows a section along line A-A of FIG. 2.

FIG. 1 shows a schematic cross-sectional view of an apparatus according to an embodiment of the invention. FIGS. 2 and 3 show schematic cross-sectional views of a thermal insulator of the apparatus. The thermal insulator 102 is shown in simplified form in FIG. 1, for clarity. Apparatus 100 as shown in FIG. 1 is for heating smokable material to volatilise at least one component of the smokable material. The thermal insulator 102 of the apparatus 100 is for receiving at least a portion of an article 104 comprising a body of smokable material 132 that is to be heated. The thermal insulator 102 is shown in more detail in FIGS. 2 and 3. The article 104 may be inserted into an opening 144 of the apparatus 100. The apparatus 100 includes a magnetic field generator 106 for generating a varying magnetic field in use and a housing 108 for housing each of the components of the apparatus 100.

In this embodiment, the magnetic field generator 106 comprises an electrical power source 114, a two-part coil 116*a*, 116*b* and a device 118 for passing a varying electrical current, such as an alternating current, through the coil 116*a*, 116*b*. In some embodiments, such as this one, the magnetic field generator 106 also includes a controller 120 and a user interface 122 for user-operation of the controller 120.

The electrical power source 114 may be a rechargeable battery. In other embodiments, the electrical power source 114 may be other than a rechargeable battery, such as a non-rechargeable battery, a capacitor, a battery-capacitor hybrid, or a connection to a mains electricity supply.

The coil 116*a*, 116*b* may take any suitable form, including the form of a single coil. In this embodiment, the two-part coil 116*a*, 116*b* is a helical coil made of electrically-conductive material, such as copper. In some embodiments, the coil 116*a*, 116*b* may be a flat coil. That is, the coil may be a pseudo two-dimensional spiral. In some embodiments, the coil may comprise a Litz wire.

The apparatus 100 may include an air inlet that fluidly connects an interior of the apparatus with an exterior of the apparatus 100. In use, a user may be able to inhale the volatilised component(s) of the smokable material 132 by drawing the volatilised component(s) through the article 104. As the volatilised component(s) is/are removed from the article, air may be drawn into the apparatus 100 via the air inlet.

The thermal insulator 102 is shown in more detail in FIGS. 2 and 3 and includes an inner wall 110 and an outer wall 112. The inner wall 110 is a heating element comprising or made of heating material that is heatable by penetration with a varying magnetic field. In one embodiment, the inner wall 110 may be formed of steel. However, a nickel-cobalt ferrous alloy, such as Kovar®, could also be used. A region encircled by the inner wall 110 may be considered to be a heating zone or a heating chamber. Together with an end closure, the inner wall 110 defines the heating zone. In other embodiments, the heating zone may be defined solely by the inner wall 110. In use, the article 104 to be heated is received in the heating zone within the inner wall 110. In FIGS. 2 and 3, the thermal insulator 102 is substantially cylindrical with a circular cross-sectional shape. In other embodiments, the thermal insulator 102 may have a different cross-sectional shape.

In one embodiment, the inner wall 110 comprises a cavity for receiving at least a portion of the article. In this embodiment, the heating zone encircled by the inner wall 110 is elongate. The inner wall 110 is a cylindrical tube. The heating zone may be sized and shaped to accommodate the whole article 104 or alternatively may be dimensioned to receive only a portion of the article 104.

The thermal insulator 102 includes an insulation region 124 bound by and arranged between the inner wall 110 and the outer wall 112. In this embodiment, the insulation region 124 encircles the inner wall 110, the outer wall 112 encircles the insulation region 124, as may be best understood from FIG. 3. The insulation region 124 is preferably evacuated to a lower pressure than an exterior of the insulation region. Providing an insulation region 124 of lower pressure effectively thermally insulates the inner wall 110 and the heating zone from the outer wall 112 and the housing 108, thereby limiting heat transfer away from the inner wall 110 and the heating zone.

The insulation region 124 of the thermal insulator 102 may comprise an open-cell porous material, for example comprising a polymer, aerogel or other suitable material. The pressure in the insulation region 124 may be in the range of $10^{-1}$ to $10^{-7}$ torr. In some embodiments, the pressure in the insulating region 124 may be considered to be a vacuum. The inner wall 110 and the outer wall 112 of the thermal insulator 102 are sufficiently strong to withstand any force exerted against them due to the pressure differential between the insulation region 124 and regions external to the inner wall 110 and the outer wall 112, thereby preventing the thermal insulator 102 from collapsing inwards. A gas-absorbing material may be used in the insulation region 124 to maintain or aid creation of a relatively low pressure in the insulation region 124.

As the inner wall 110 functions as both a heating element and a wall of the thermal insulator 102 in this embodiment, the overall size and weight of the apparatus 100 can be reduced as there is no requirement to include a separate heating element and a separate inner wall for the insulation. The inner wall 110 is able to function as both a heating element and a wall of the thermal insulator 102 due to the fact that it is heatable by induction heating and/or magnetic hysteresis heating. Induction heating and magnetic hysteresis heating do not require a physical connection to be provided between a source of a varying magnetic field and a heating element, which removes the requirement for wires or any other physical connection between the power source and the heating element.

The insulation region 124 serves to reduce heat transfer away from the inner wall 110 via conduction and/or radiation or by any other known heat transfer phenomenon.

FIG. 3 shows a section through line A-A of FIG. 2. FIGS. 2 and 3 are not drawn to scale. In FIG. 2, the outer wall 112 is shown as extending only partially along a length of the inner wall 110. That is, the outer wall 112 extends along only a portion of the inner wall 110, such that the thermal insulation may be provided around only a portion of the inner wall 110. Providing an outer wall 112 that extends only part of the way along the length of the inner wall 110 means that the overall size of the apparatus 100 may be reduced. Alternatively, the outer wall 112 may extend along the entire length of the inner wall 110. The outer wall 112 and the inner wall 110 may be co-axial with one another.

As shown in FIG. 1, the coil 116*a*, 116*b* may encircle at least part of the thermal insulator 102. The coil 116*a*, 116*b* may encircle at least part of the outer wall 112 of the thermal insulator 102. In one embodiment, the coil 116*a*, 116*b* and the outer wall 112 may be formed as a single, integral element, such as by at least partially embedding the coil 116*a*, 116*b* in the outer wall 112, but in other embodiments the coil 116*a*, 116*b* and the outer wall 112 may be provided as separate elements.

In one embodiment, magnetic shielding 140 is provided around at least part of the coil 116*a* 116*b*. The magnetic shielding 140 aims to reduce or avoid interaction between the magnetic field and anything other than the heating element, i.e. the inner wall 110 in this embodiment. The magnetic shielding can be formed of any material(s) suitable for containing a magnetic field, such as ferrite.

In some embodiments, the outer wall 112 is formed from a magnetically impermeable and electrically non-conductive material, such that the outer wall 112 will not be heated by induction heating and/or magnetic hysteresis heating when exposed to a varying magnetic field. For example, the outer wall 112 may be formed of a glass, such as a borosilicate, or ceramic material. Providing an outer wall 112 of magnetically impermeable material means that, when a varying electrical current, such as an alternating current, is passed through the coil 116*a*, 116*b*, the inner wall 110 of the thermal insulator 102 will be heated, whereas the outer wall 112 will not be heated by induction heating and/or magnetic hysteresis heating. Therefore, the efficiency of the system is improved, as energy is not wasted heating the outer wall 112. If the outer wall 112 were to be heated by virtue of the varying electrical current, the inner wall 110 may in fact only be heated minimally, which would be undesirable. This arrangement also serves to keep an outside temperature of the housing 108, particularly its surface, at an acceptable level for handling by a user.

Figure 10:
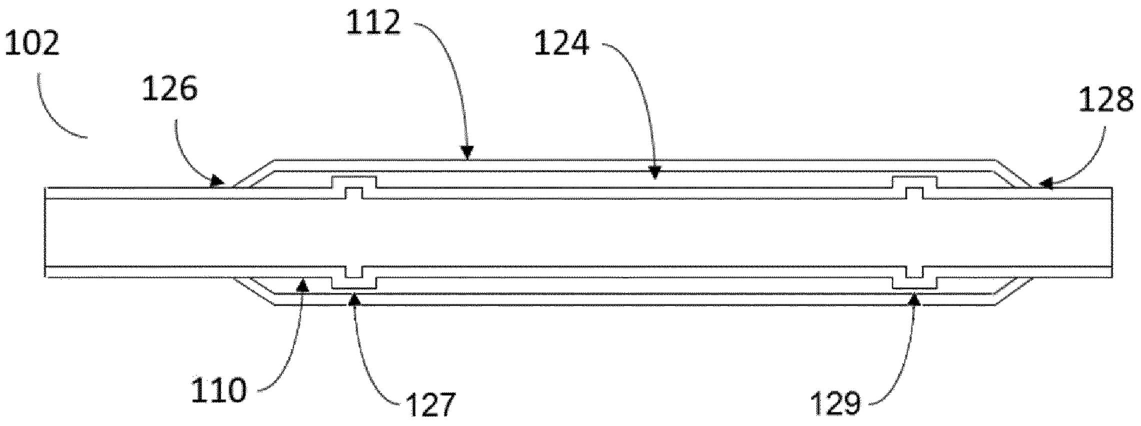
FIG. 10 shows a schematic cross-sectional view of an example of another thermal insulator for use in an apparatus for heating smokable material to volatilise at least one component of the smokable material.

FIG. 10 shows a schematic cross-sectional view of an example of another thermal insulator for use in an apparatus according to an embodiment of the invention. In this embodiment, the thermal insulator 102 is the same as the thermal insulator 102 of FIGS. 2 and 3, except that the inner wall 110 comprises two deformable structures 127, 129. More specifically, as will be understood from FIG. 10, the inner wall 110 is connected to the outer wall 112 at a first position on the inner wall 110 and at a second position on the inner wall 110. During heating of the heating material of the inner wall 110, the two deformable structures 127, 129 deform to accommodate thermal expansion of a section of the inner wall 110 between the first and second positions. Each of the deformable structures 127, 129 could be considered analogous to an expansion joint.

In this embodiment, the inner wall 110 is a cylindrical tube, the thermal expansion is or comprises axial thermal expansion, and each of the structures 127, 129 is axially deformable to accommodate or absorb the axial thermal expansion. This helps to reduce or avoid stress being applied to the outer wall 112 and to the connections between the inner and outer walls 110, 112 at the first and second positions on the inner wall 110. This can be particularly advantageous when the outer wall 112 is inflexible or less flexible than the inner wall 110, such as when the outer wall is made of, or comprises, glass or ceramic.

In other embodiments, the inner wall 110 may comprise only one such deformable structure, or may comprise more than two such deformable structures.

In some embodiments, such as that illustrated, the or each deformable structure comprises two radially extending members that are joined by a connection member. During deformation of the structure, the connection member and/or the radially extending members and/or the joints between the connection member and the radially extending members flex, to permit relative movement of the ends of the radially extending members distal from the connection member.

While the at least one deformable structure has been described specifically with reference to the thermal insulator 102 of FIG. 10 for conciseness, it will be appreciated that the at least one deformable structure could correspondingly be incorporated into variants of any of the embodiments of thermal insulators 102 or apparatuses described herein to form further embodiments of thermal insulators 102 and apparatuses, respectively.

Figure 11:
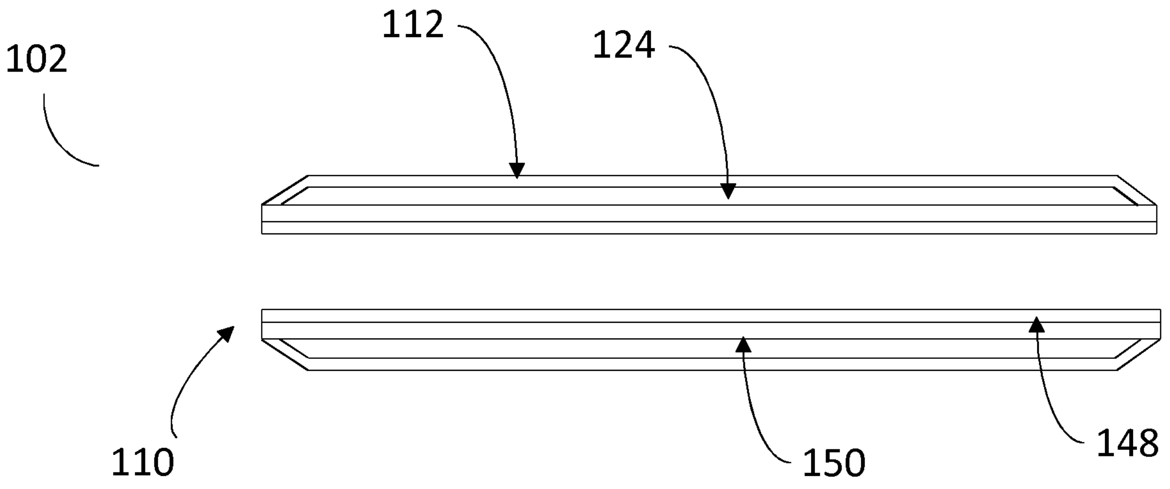
FIG. 11 shows a schematic cross-sectional view of an example of another thermal insulator for use in an apparatus for heating smokable material to volatilise at least one component of the smokable material.

FIG. 11 shows a schematic cross-sectional view of an example of another thermal insulator for use in an apparatus according to an embodiment of the invention. In this embodiment, the thermal insulator 102 is the same as the thermal insulator 102 of FIGS. 2 and 3, except that a heating element comprising heating material 142 comprises a metallized layer 148 of the inner wall 110. The outer wall 112 is formed from an electrically non-conductive and/or magnetically impermeable material, such as glass or ceramic. The inner wall 110 includes a support 150 formed from an electrically non-conductive and/or magnetically impermeable material, such as glass or ceramic, and the metallized layer 148. In the embodiment shown in FIG. 11, the support 150 is located between the metallized layer 148 and the insulation region 124. The metallized layer 148 is heatable by penetration with a varying magnetic field. The metallized layer is formed from an electrically conductive and/or magnetically permeable material, such as iron. The metallized layer may be applied in a powdered form, or as a coating or plating, for example. Providing a metallized layer 148 reduces the overall size of the thermal insulator 102.

Figure 12:
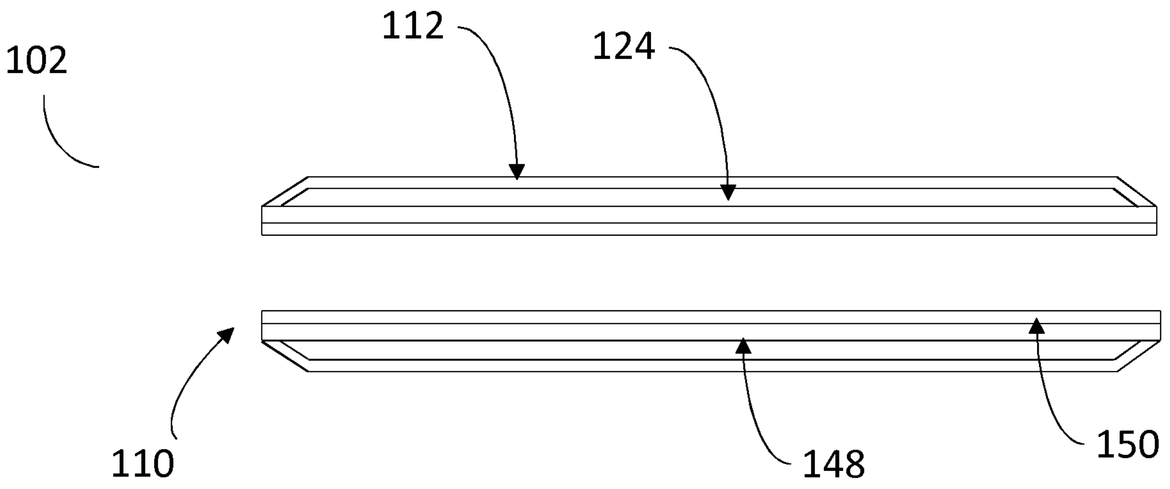
FIG. 12 shows a schematic cross-sectional view of an example of another thermal insulator for use in an apparatus for heating smokable material to volatilise at least one component of the smokable material.

FIG. 12 shows a schematic cross-sectional view of an example of another thermal insulator for use in an apparatus according to an embodiment of the invention. In this embodiment, the thermal insulator 102 is the same as the thermal insulator 102 of FIG. 11 except the metallized layer 148 is between the support 150 and the insulation region 124. Any of the herein-described variations to the thermal insulator of FIG. 11 may be made to the thermal insulator of FIG. 12 to form other embodiments.

Figure 4:
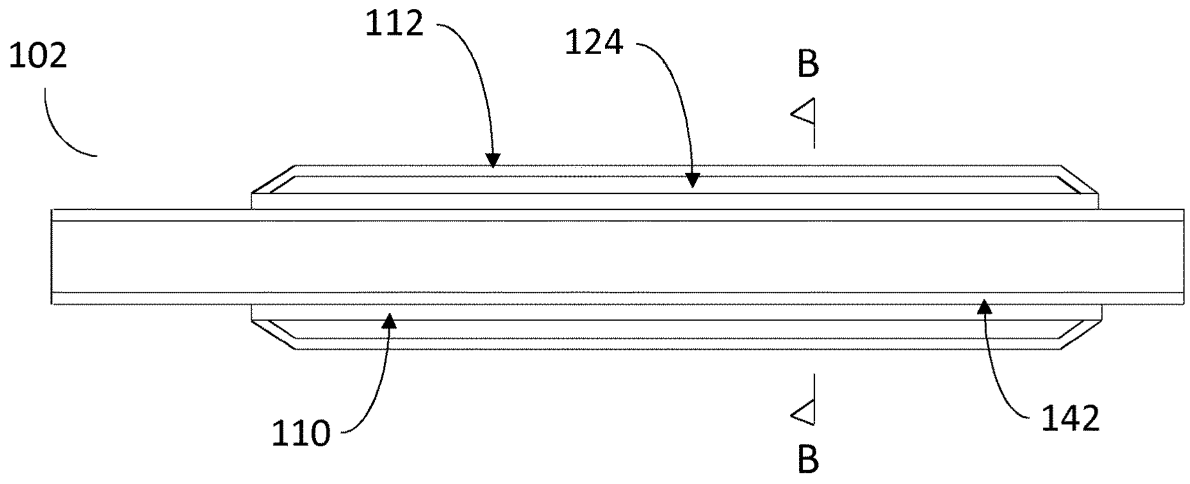
FIG. 4 shows a schematic cross-sectional view of an example of another thermal insulator for use in an apparatus for heating smokable material to volatilise at least one component of the smokable material.
Figure 5:
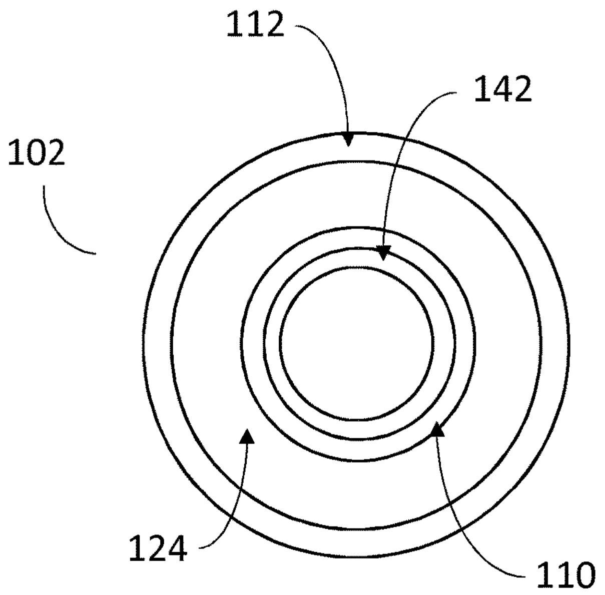
FIG. 5 shows a section along line B-B of FIG. 4.

FIGS. 4 and 5 show schematic cross-sectional views of another thermal insulator for use in an apparatus according to an embodiment of the invention. In this embodiment, the inner and outer walls 110, 112 are formed from electrically non-conductive and/or magnetically impermeable material. The inner wall 110 is adjacent to a heating element 142 comprising heating material that is heatable by penetration with a varying magnetic field. The heating element 142 is formed from an electrically conductive and/or magnetically permeable material. The heating element 142 is hollow, as shown in FIG. 5, such that an article 104 comprising smokable material may be received therein. An embodiment of the apparatus of the present invention includes the thermal insulator of FIGS. 4 and 5 and the heating element 142, in place of the thermal insulator 102 with integral heating element of FIGS. 2 and 3.

In one embodiment, such as that of FIGS. 1 to 3, the coil 116*a*, 116*b* extends along a central longitudinal axis that is substantially aligned with a central longitudinal axis of the inner wall 110, such that the coil 116*a*, 116*b* is substantially co-axial with the inner wall 110. That is, the aligned axes are coincident. In a variation to this embodiment, the aligned axes may instead be parallel to one another. In this embodiment, the coil 116*a*, 116*b* is in a fixed position relative to the inner wall 110.

In the embodiment of FIGS. 1 to 3, the device 118 for passing a varying current through the coil 116*a*, 116*b* is electrically connected between the electrical power source 114 and the coil 116*a*, 116*b*. In an embodiment, the controller 120 is also electrically connected to the electrical power source 114, and is communicatively connected to the device 118 to control the device 118. More specifically, in this embodiment, the controller 120 is for controlling the device 118, so as to control the supply of electrical power from the electrical power source 114 to the coil 116*a*, 116*b*. In one embodiment, the controller 120 may comprise an integrated circuit (IC), such as an IC on a printed circuit board (PCB). In other embodiments, the controller 120 may take a different form. In some embodiments, the apparatus 100 may have a single electrical or electronic component comprising the device 118 and the controller 120. The controller 120 may be operated in this embodiment by user operation of a user interface 122. In this embodiment, the user interface 122 is located at the exterior of the housing 108. The user interface 122 may comprise a push-button, a toggle switch, a dial, a touchscreen, or the like. In other embodiments, the user interface 122 may be remote and connected to the apparatus 100 wirelessly, such as via Bluetooth®. In this embodiment, operation of the user interface 122 by a user causes the controller 120 to allow the device 118 to cause an alternating electrical current to pass through the coil 116*a*, 116*b*, so as to cause the coil 114 to generate an alternating magnetic field.

The coil 116*a*, 116*b* and the inner wall 110 of the apparatus 100 are suitably relatively positioned so that the varying magnetic field produced by the coil 116*a*, 116*b* in use penetrates the heating material of the inner wall 110. When the heating material of the inner wall 110 is an electrically-conductive material, as in the present embodiment, this may cause the generation of one or more eddy currents in the heating material. The flow of eddy currents in the heating material against the electrical resistance of the heating material causes the heating material to be heated by Joule heating. In this embodiment, the heating material is also made of a magnetic material, and so the orientation of magnetic dipoles in the heating material changes with the changing applied magnetic field, which causes heat to be generated in the heating material by magnetic hysteresis. As discussed previously, in some embodiments, the outer wall 112 is formed from a magnetically impermeable and/or electrically non-conductive material such that it will not heat up when exposed to a varying magnetic field. Providing such an outer wall 112 means that the inner wall 110 benefits more greatly from the effect of the varying magnetic field.

In an embodiment, the coil 116*a*, 116*b* encircles only part of the outer wall 112. In other embodiments, the coil 116*a*, 116*b* encircles the outer wall 112 along the full length of the outer wall 112.

In one embodiment, the coil 116*a*, 116*b* comprises a first part 116*a* that encircles a first portion of the outer wall 112 and a second part 116*b* that encircles a second portion of the outer wall 112. The controller 120 may control the device 118 to pass a varying electrical current, such as an alternating current, through the first part 116*a* to heat a first portion of the inner wall 110. The controller 120 of the magnetic field generator 106 may control the device 118 to pass a varying electrical current, such as an alternating current, through the second part 116*a* to heat a second portion of the inner wall 110. The controller 120 of the magnetic field generator 106 may selectively and independently control the device 118 to pass a varying electrical current, such as an alternating current, through the first part 116*a* and the second part 116*b*, such that the first and second portions of the inner wall 110 may be heated independently from one another. Accordingly, when an article 104 comprising smokable material is located in the heating zone, in use, a first section of the article 104 is heated by the first portion of the inner wall 110 and a second section of the article 104 is heated by the second portion of the inner wall 110. Providing a first coil part and a second coil part in this way helps to enable an aerosol to be formed and released relatively rapidly from a first section of the article, for inhalation by a user, and allows a second subsequent release of aerosol from a second section of the article when the second coil part is activated. It will be appreciated that a coil of more than two parts, or multiple coils can also be provided. Similarly, multiple coils or multiple parts of coils could be in operation simultaneously, possibly according to user preference.

In some cases, the article 104 to be used with the apparatus 100 may comprise a heating element comprising heating material that is heatable by penetration with a varying magnetic field. The heating element may be arranged in the article so that, when the article 104 is located in the heating zone of the apparatus 100 and the magnetic field generator 106 controls the device 118 to pass a varying electrical current, such as an alternating current, through the coil 116*a*, 116*b* to heat the inner wall 110, then the article 104 is heated by both the heating element of the article 104 and inner wall 110 of the apparatus 100.

In one embodiment, an impedance of the coil 116*a*, 116*b* of the magnetic field generator 106 is equal, or substantially equal, to an impedance of the inner wall 110. If the impedance of the inner wall 110 were instead lower than the impedance of the coil 116*a*, 116*b*, then the voltage generated across the inner wall 110 in use may be lower than the voltage that may be generated across the inner wall 110 when the impedances are matched. Alternatively, if the impedance of the inner wall 110 were instead higher than the impedance of the coil 116*a*, 116*b*, then the electrical current generated in the inner wall 110 in use may be lower than the current that may be generated in the inner wall 110 when the impedances are matched. Matching the impedances may help to balance the voltage and current to maximise the heating power generated in the inner wall 110, in use. In some embodiments, the impedance of the device 118 may be equal, or substantially equal, to a combined impedance of the coil 116*a*, 116*b* and the inner wall 110.

The apparatus 100 may comprise a temperature sensor 130 for sensing a temperature of the inner wall 110. The temperature sensor 130 may be communicatively connected to the controller 120, so that the controller 120 is able to monitor the temperature of the inner wall 110 or of the heating zone. On the basis of one or more signals received from the temperature sensor 130, the controller 120 may cause the device 118 to adjust a characteristic of the varying or alternating electrical current passed through the coil 116*a*, 116*b* as necessary, in order to ensure that the temperature of the heating zone or of the inner wall 110 remains within a predetermined temperature range. The characteristic may be, for example, amplitude or frequency or duty cycle. Within the predetermined temperature range, in use, the smokable material within the article located in the heating zone is heated sufficiently to volatilise at least one component of the smokable material without combusting the smokable material. Accordingly, in this embodiment, the controller 120, and the apparatus 100 as a whole, is arranged to heat the smokable material to volatilise the at least one component of the smokable material without combusting the smokable material. In some embodiments, the operating temperature range is from about 50° C. to about 350° C., such as between about 50° C. and about 250° C., between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than within these ranges. In some embodiments, the upper limit of the temperature range could be greater than 350° C. In some embodiments, the temperature sensor 130 may be omitted. In some embodiments, the heating material of the inner wall 110 may have a Curie point temperature selected on the basis of the maximum temperature to which it is desired to heat the heating material, so that further heating above that temperature by induction heating the heating material is hindered or prevented.

Figure 6A:
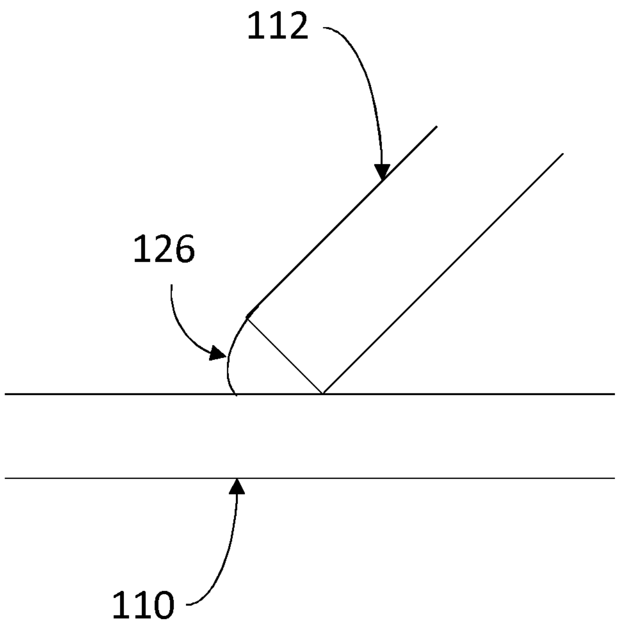
FIGS. 6*a* and 6*b* show details of a join between an inner wall and an outer wall of a thermal insulator for use in an apparatus for heating smokable material to volatilise at least one component of the smokable material.
Figure 6B:
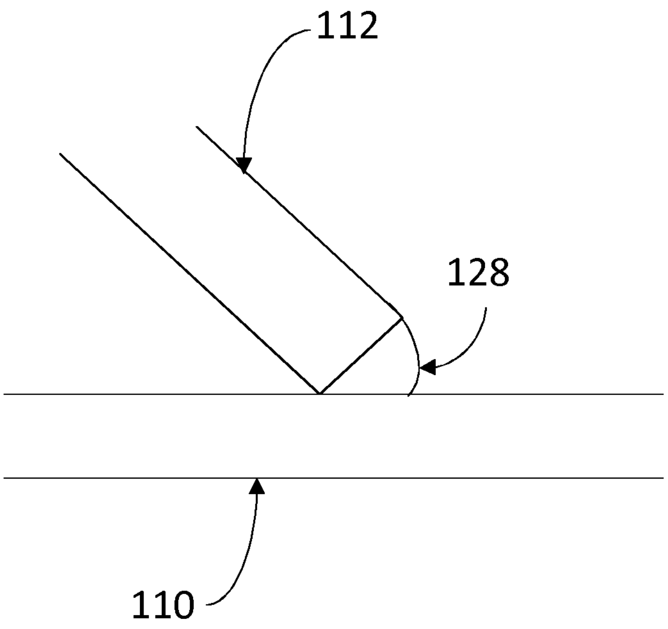

FIGS. 6A and 6B show details of connections between the inner wall 110 and the outer wall 112 of the thermal insulator, according to an embodiment of the invention. An end of the insulation region 124 of the thermal insulator 102 may taper as the outer wall 112 and the inner wall 110 converge to an outlet (not shown) through which gas in the insulation region 124 may be evacuated to create a vacuum during manufacture of the thermal insulator 102. FIGS. 6A and 6B show a detail of the outer wall 112 converging towards the inner wall 110, but a converse arrangement, in which the inner wall 110 converges to the outer wall 112, could alternatively be used. The converging end of the outer wall 112 is configured to guide gas molecules in the insulation region 124 out of the outlet and thereby evacuate the insulation region 124 to a lower pressure than an exterior of the insulation region during manufacture. The outlet is sealable so as to maintain a vacuum or a region of lower pressure in the insulation region 124 after the insulation region 124 has been evacuated. The outlet can be sealed, for example, by creating a brazed seal ring 126, 128 at the outlet by brazing material onto the inner and outer walls 110, 112 at the outlet after gas has been evacuated from the insulation region 124. However, alternative sealing techniques could be used. The brazed seal rings 126, 128 at the junction between the inner wall 110 and the outer wall 112 act to reduce heat transfer away from the inner wall 112 via convection, thereby reducing energy losses in the system.

In certain embodiments, the inner 110 and outer 112 walls may comprise dissimilar materials that are joined together. For example, the outer wall 112 may comprise a glass or ceramic material and the inner wall 110 may comprise a metal or metal alloy. In these cases, the outer wall 112 and the metal inner wall 110 may be brazed together with a silver eutectic braze material. The braze material may be applied to single joints in succession in an order dependent on the temperature tolerance of the materials involved. For instance, the highest temperature bonding process may first be applied to the material of the first wall to form a first join to that wall. The temperature of the bonding process may then be stepped down to form a second join to the other wall.

In embodiments where the outer wall 112 comprises a glass material and the inner wall 110 comprises a metal or metal alloy, the joining process may comprise a glass-to-metal seal in which a bond is formed between the inner 110 and outer 112 walls by high-temperature melting of the glass and/or the metal/metal alloy.

Figure 14:
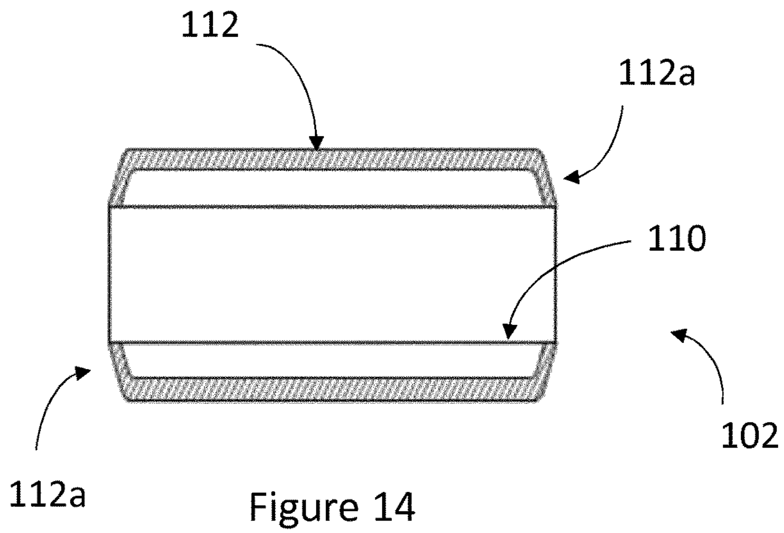
FIG. 14 shows a schematic cross-sectional view of an example of another thermal insulator for use in an apparatus for heating smokable material to volatilise at least one component of the smokable material.

In certain embodiments, the ends of the outer wall 112 may be shaped to have a close fit with the inner wall 110 before bonding takes place. One example of an outer wall 112 having shaped ends is shown in FIG. 14. Each end of the outer wall 112 may comprise a flared end 112*a* that is shaped so that the outer wall 112 forms a close fit with the inner wall 110. As can be seen in FIG. 14, the ends 112*a* may be flared downwards towards the inner wall 110 to form the close fit with the inner wall 110. In some embodiments, where the outer wall 112 comprises a glass material, the glass material may be heated and deformed to form a close fit with the inner wall 110.

Figure 15:
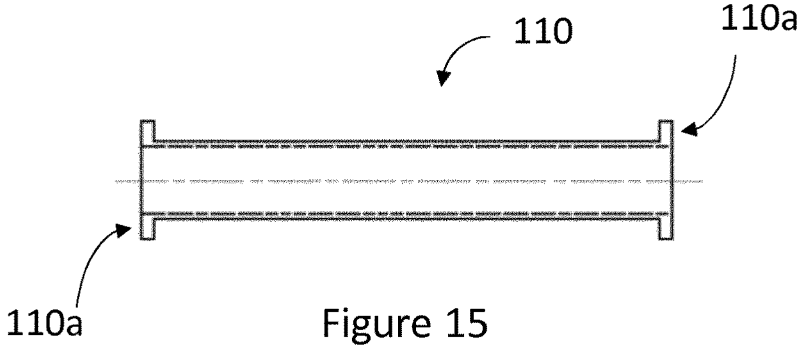
FIG. 15 shows a schematic cross-sectional view of an example of another thermal insulator for use in an apparatus for heating smokable material to volatilise at least one component of the smokable material.

In some embodiments, the inner wall 110 may be shaped to form a close fit with the outer wall 112 when the walls are assembled together. One example of an inner wall 110 having shaped ends is shown in FIG. 15. The ends of the inner wall 110 each comprise a flange 110*a*. When the inner wall 110 is assembled with the outer wall 112, the flanges 110*a* extend towards an inner surface of the outer wall 112 so that the inner and outer 112 walls have a close fit.

In some embodiments, the shaped ends of the inner wall 110 and/or outer wall 112 may be heated so that a bond is formed with the inner surface of the outer wall 112. For example, the shaped ends may be heated such that the material forming the outer wall 112 melts to bond against the shaped ends of the inner wall 110, or vice versa. The heating may comprise induction heating, for example.

Any of the above described assembly and/or joining techniques, or any other suitable technique, may be used in assembling and/or joining the inner wall 110 to the outer wall 112.

In order to evacuate the insulation region 124, the thermal insulator 102 may be placed in a low pressure, substantially evacuated environment such as a vacuum furnace chamber so that gas molecules in the insulation region 124 flow into the low pressure environment outside the thermal insulator 102. When the pressure inside the insulation region 124 becomes low, the tapered geometry of the outer wall 112 and the inner wall 110, guide any remaining gas molecules out of the insulation region 124 via the outlet.

In some embodiments, one or more low emissivity coatings may be present on internal surfaces of the insulation region 124, i.e. on an outer surface of the inner wall 110 and an inner surface of the outer wall 112. Providing one or more such low emissivity coatings may aid in reducing heat transfer via infrared radiation.

In some embodiments, a reflective surface is provided on a surface of the inner wall 110 that bounds the insulation region 124. Alternatively or in addition, a reflective surface may be provided on a surface of the outer wall 112 that bounds the insulation region 124. The reflective surface acts to reduce heat transfer away from the inner wall 110 by radiation.

Although the shape of the thermal insulator 102 has been generally described so far herein as being substantially cylindrical or similar, the thermal insulator 102 could be formed as another shape, for example a cuboid. In one embodiment, the inner wall 110 is tubular and encircles the heating zone. The inner wall 110 may have a substantially circular cross-section. However, in other embodiments, the inner wall 110 may have a cross-section other than circular, such as square, rectangular, polygonal or elliptical.

Figure 7:
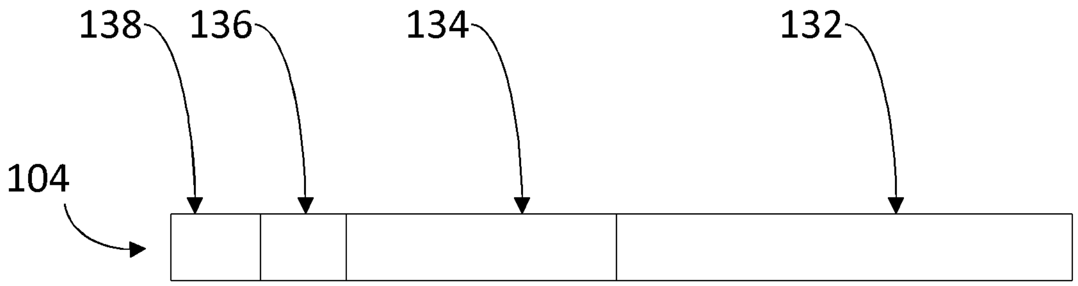
FIG. 7 shows an example of an article comprising smokable material for use with an apparatus for heating smokable material to volatilise at least one component of the smokable material.

Referring to FIG. 7, there is shown a schematic cross-sectional view of an article 104 comprising smokable material, according to an embodiment of the invention. The article 104 of this embodiment is particularly suitable for use with the apparatus 100 shown in FIG. 1, or an apparatus that has the thermal insulator of FIGS. 4 and 5 and the heating element 142, in place of the thermal insulator 102 with integral heating element of FIGS. 2 and 3. In use, the article 104 may be removably inserted into the heating zone at an opening 144 of the apparatus 100.

In one embodiment, the article 104 is in the form of a substantially cylindrical rod that includes a body of smokable material 132 and a filter assembly in the form of a rod. The filter assembly of this embodiment comprises three segments: a cooling segment 134, a filter segment 136 and a mouth end segment 138. However, in other embodiments any one or two or all of these segments 134, 136, 138 may be omitted.

The body of smokable material 132 is located towards a distal end of the article 104. In one embodiment, the cooling segment 134 is located between the body of smokable material 132 and the filter segment 136, such that the cooling segment 134 is in an abutting relationship with the smokable material 132 and the filter segment 136. The filter segment 136 is located between the cooling segment 134 and the mouth end segment 138. The mouth end segment 138 is located towards a proximal end of the article 104, adjacent the filter segment 136. In one embodiment, the filter segment 136 is in an abutting relationship with the mouth end segment 138.

In one embodiment, the body of smokable material 132 comprises tobacco. However, in other respective embodiments, the body of smokable material 132 may consist of tobacco, may consist substantially entirely of tobacco, may comprise tobacco and smokable material other than tobacco, may comprise smokable material other than tobacco, or may be free of tobacco. The smokable material may include an aerosol forming agent, such as glycerol.

In one embodiment, the cooling segment 134 is an annular tube and is located around and defines an air gap within the cooling segment 134. The air gap provides a chamber for heated volatilised components generated from the body of smokable material 132 to flow. The cooling segment 134 is hollow to provide a chamber for aerosol accumulation yet rigid enough to withstand axial compressive forces and bending moments that might arise during manufacture and whilst the article 104 is in use during insertion into the apparatus 100. The cooling segment 134 provides a physical displacement between the smokable material 132 and the filter segment 136. The physical displacement provided by the cooling segment 134 will provide a thermal gradient across the length of the cooling segment 134.

The filter segment 136 may be formed of any filter material sufficient to remove one or more volatilised compounds from heated volatilised components from the smokable material. In one embodiment the filter segment 136 is made of a mono-acetate material, such as cellulose acetate. The presence of the filter segment 136 provides an insulating effect by providing further cooling to the heated volatilised components that exit the cooling segment 136. This further cooling effect reduces the contact temperature of the user's lips on the surface of the filter segment 136.

The mouth end segment 138 is an annular tube and is located around and defines an air gap within the mouth end segment 138. The air gap provides a chamber for heated volatilised components that flow from the filter segment 138.

In one embodiment, the total length of the article 104 is between 71 mm and 95 mm, more preferably, total length of the article 104 is between 79 mm and 87 mm, more preferably still, total length of the article 104 is 83 mm.

In one embodiment, the article 104 is elongate and substantially cylindrical with a substantially circular cross-section. However, in other embodiments, the article 104 may have a cross-section other than circular and/or not be elongate and/or not be cylindrical.

Figure 8:
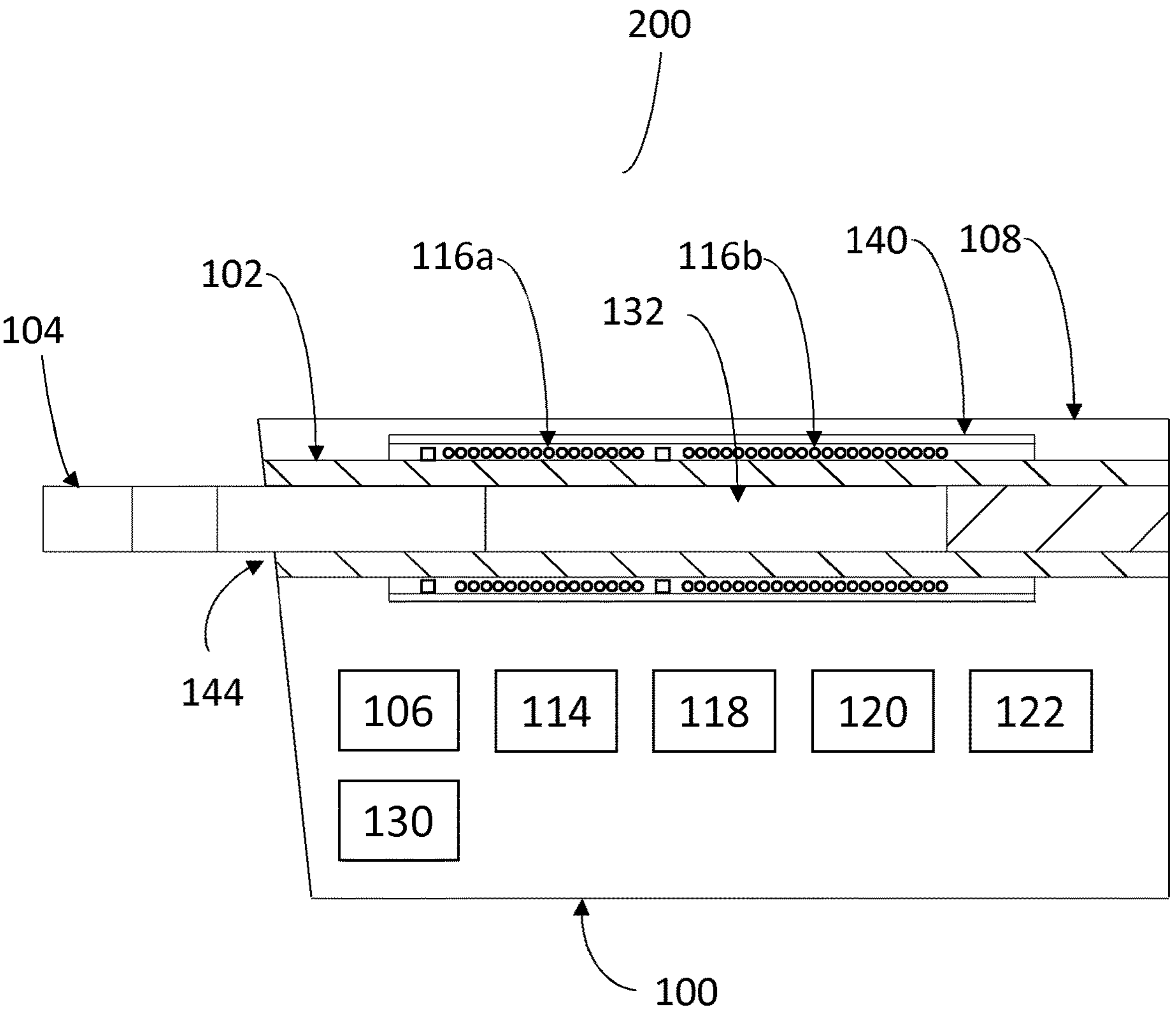
FIG. 8 shows a schematic cross-sectional view of an example of a system comprising an article including smokable material and an apparatus for heating the smokable material to volatilise at least one component of the smokable material.

Referring to FIG. 8, there is shown a schematic cross-sectional view of a system according to an embodiment of the invention. The system 200 comprises the apparatus 100 of FIG. 1 and the article 104 of FIG. 7. For conciseness, the apparatus 100 and the article 104 have not been described in detail again.

In use, the article 104 is received within the heating zone of the apparatus. As described above, the inner wall 110 is heatable by penetration with a varying magnetic field to heat heating zone. The article in the heating zone will, in turn, be heated to cause one or more volatilised components of the smokable material to be released.

In use, air may be drawn into the article 104 through the distal end of the article 104 via an inlet that fluidly connects an interior of the apparatus 100 with an exterior of the apparatus 100. The air may pass through the smokable material 132 and pick up volatilised components released from the smokable material 132, and then the volatilised components, typically in the form of vapour or an aerosol, may be drawn through the filter assembly of the article 104 and through the proximal end of the article 104 for consumption by a user.

In one embodiment, when the article 104 is in the heating zone, the inner wall 110 is in thermal contact with the smokable material 132 of the article 104. In one embodiment, the smokable material 132 is in surface contact with the inner wall 110. Therefore, the inner wall 110 is heatable in use to directly heat the smokable material 132. In other embodiments, the heating material of the inner wall 110 may be kept out of surface contact with the smokable material 132, but still in a thermal relationship with the smokable material 132.

In other embodiments, as discussed above with reference to FIGS. 4 and 5, the inner wall 110 is adjacent to a heating element comprising heating material that is heatable by penetration with a varying magnetic field. In such embodiments, the heating element 142 is in thermal contact (and preferably in surface contact) with the smokable material 132 of the article 104, so as to heat the smokable material 132 in use.

Figure 13:
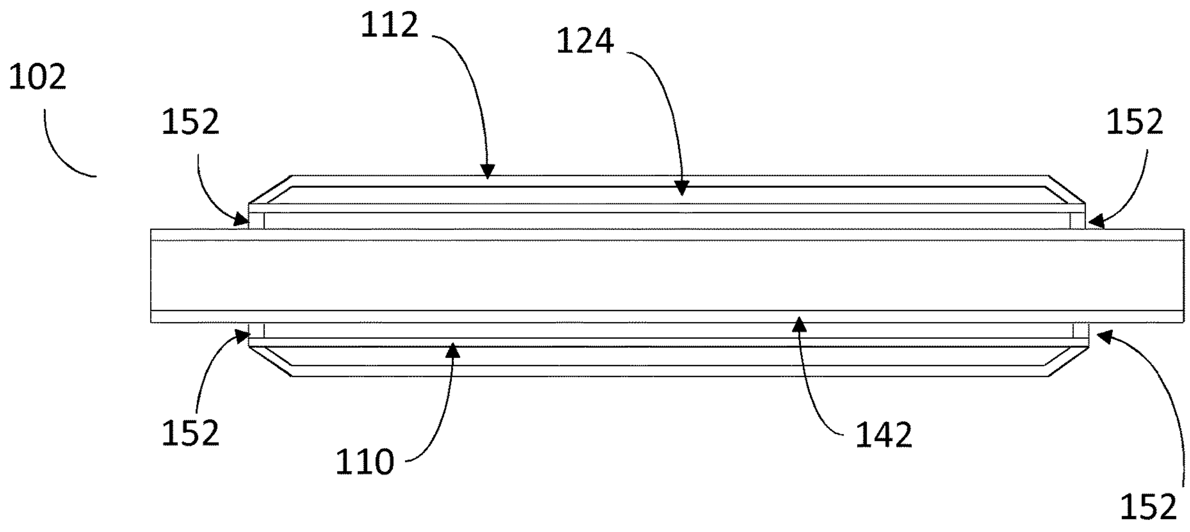
FIG. 13 shows a schematic cross-sectional view of an example of a thermal insulator and heating element for use in an apparatus for heating smokable material to volatilise at least one component of the smokable material.

FIG. 13 shows a schematic cross-sectional view of an example of another thermal insulator for use in an apparatus according to an embodiment of the invention. In this embodiment, the thermal insulator 102 is the same as the thermal insulator 102 of FIG. 4 except that the heating element 142 is connected to the inner wall 110 by one or more deformable attachments 152. In FIG. 13, four deformable attachments 152 are shown, but in other embodiments there may be more or fewer, such as one or two. In some example, the deformable attachments 152 provide a structural connection between the inner wall 110 and the heating element 142, whilst also allowing a limited relative movement between inner wall 110 and the heating element 142. During heating, the inner wall 110 and the heating element 142 may expand at different rates. Allowing some relative movement between the inner wall 110 and the heating element 142 due to different rates of thermal expansion helps to reduce or avoid stress being applied to the inner wall 110 and the heating element 142. This can be particularly advantageous when the inner wall 110 is inflexible or less flexible than the inner wall heating element 142, such as when the inner wall is made of, or comprises, glass or ceramic. In some embodiments, the deformable attachments may be made from high temperature silicone, for example.

In one embodiment, the length of the body of smokable material 132 is approximately equal to the length of the inner wall 110. This can help to provide more effective heating of the body of smokable material 132 in use. In other embodiments, the length of the body of smokable material 132 may be less than or greater than the length of the inner wall 110.

In one embodiment, the inner wall 110 is impermeable to air or volatilised material, and is substantially free from discontinuities.

Figure 9:
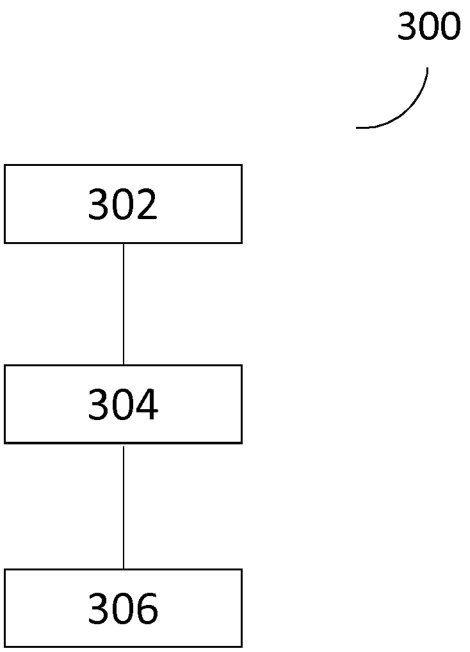
FIG. 9 shows a flow diagram showing an example of a method of heating smokable material to volatilise at least one component of the smokable material.

Referring to FIG. 9 there is shown a flow diagram showing a method of heating smokable material to volatilise at least one component of the smokable material according to an embodiment of the invention.

The method 300 comprises providing 302 an apparatus according to an embodiment of the present invention, such as the apparatus 100 as shown in FIG. 1 and described above. The method also comprises locating 304 an article comprising smokable material, such as the article 104 shown in FIG. 7 and described above, in the heating zone of the apparatus. The method further comprises penetrating 306 the heating material of the apparatus with a varying magnetic field to heat the heating zone and the smokable material of the article.

In each of the embodiments discussed above, the heating material is steel. However, in other embodiments, the heating material may comprise one or more materials selected from the group consisting of: an electrically-conductive material, a magnetic material, and a magnetic electrically-conductive material. In some embodiments, the heating material may comprise a metal or a metal alloy. In some embodiments, the heating material may comprise one or more materials selected from the group consisting of: aluminium, gold, iron, nickel, cobalt, conductive carbon, graphite, plain-carbon steel, stainless steel, ferritic stainless steel, copper, and bronze. Other heating material(s) may be used in other embodiments. It has been found that, when magnetic electrically-conductive material is used as the heating material, magnetic coupling between the magnetic electrically-conductive material and an electromagnet of the apparatus in use may be enhanced. In addition to potentially enabling magnetic hysteresis heating, this can result in greater or improved Joule heating of the heating material, and thus greater or improved heating of the smokable material.

The heating material may have a skin depth, which is an exterior zone within which most of an induced electrical current and/or induced reorientation of magnetic dipoles occurs. By providing a relatively small thickness, a greater proportion of the heating material may be heatable by a given varying magnetic field, as compared to heating material having a depth or thickness that is relatively large as compared to the other dimensions of the heating material. Thus, a more efficient use of material is achieved and, in turn, costs are reduced.

In some embodiments, a first portion of the inner wall 110 may be made of a first material and a second portion of the inner wall 110 may be made of a second material that is different from the first material. The first material may be a heating material that is heatable by penetration with a varying magnetic field. Examples of such heating materials are discussed above. The second material may, or may not, be a heating material that is heatable by penetration with a varying magnetic field, but it should be a thermal conductor. The first portion of the inner wall 110 may be located towards the proximal or mouth end of the apparatus 100, such that when a varying magnetic field is applied to the inner wall 110, the first portion is heated and therefore will heat a portion of the body of smokable material 132 that is located towards the proximal or mouth end of the body of smokable material 132 first. The second portion of the inner wall 110 will then be heated via conduction, which in turn will heat the a portion of the body of smokable material 132 that is located towards the distal end of the body of smokable material 132.

In some embodiments, the smokable material is non-liquid smokable material, and the apparatus is for heating non-liquid smokable material to volatilise at least one component of the smokable material. In other embodiments, the opposite may be true. In some embodiment the apparatus is for heating a liquid smokable material to volatilise at least one component of the liquid smokable material, which subsequently passes through a non-liquid smokable material.

In each of the above described embodiments, the article 104 is a consumable article. Once all, or substantially all, of the volatilisable component(s) of the smokable material 132 in the article 104 has/have been spent, the user may remove the article 104 from the apparatus 100 and dispose of the article 104. The user may subsequently re-use the apparatus 100 with another similar article 104.

In some embodiments, the apparatus 100 is sold, supplied or otherwise provided separately from the articles 104 with which the apparatus 100 is usable. However, in some embodiments, the apparatus 100 and one or more of the articles 104 may be provided together as a system 200, such as a kit or an assembly, possibly with additional components, such as cleaning utensils.

In order to address various issues and advance the art, the entirety of this disclosure shows by way of illustration and example various embodiments in which the claimed invention may be practised and which provide for superior apparatus for heating smokable material to volatilise at least one component of the smokable material, superior systems comprising such apparatus and such articles, and superior methods of heating smokable material to volatilise at least one component of the smokable material. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An apparatus for heating smokable material to volatilize at least one component of the smokable material, the apparatus comprising:

a thermal insulator comprising:

an inner wall at least partially defining a heating zone for receiving at least a portion of an article comprising smokable material, wherein the inner wall comprises heating material that is heatable by penetration with a varying magnetic field to heat the heating zone;

an outer wall, and an insulation region bound by the inner wall and the outer wall, wherein the insulation region is evacuated to a lower pressure than an exterior of the insulation region; and a magnetic field generator for generating a varying magnetic field that penetrates the inner wall in order to heat the inner wall in use.

2. The apparatus of claim 1, wherein the outer wall is at least one of magnetically impermeable or electrically non-conductive.

3. The apparatus of claim 1, wherein the outer wall comprises glass or ceramic.

4. The apparatus according to claim 1, wherein the magnetic field generator comprises a coil that encircles at least part of the outer wall.

5. The apparatus according to claim 4, wherein the coil comprises a helical coil.

6. The apparatus according to claim 4 or claim 5, wherein the coil comprises a Litz wire.

7. The apparatus according to claim 4, wherein the coil comprises a first part to heat a first section of the inner wall and a second part to heat a second section of the inner wall, wherein the first part and the second part are independently controllable.

8. The apparatus according to claim 4, comprising a second coil that encircles at least part of the outer wall, wherein the coil and the second coil are independently controllable.

9. The apparatus according to claim 1, comprising braze rings located at a junction between the inner wall and the outer wall to seal the insulation region.

10. The apparatus according to claim 1, wherein the outer wall extends only partially along a length of the inner wall.

11. The apparatus according to claim 1, wherein the inner wall is a cylindrical tube.

12. The apparatus according to claim 1, comprising magnetic shielding surrounding the magnetic field generator.

13. The apparatus according to claim 1, wherein the heating material comprises one or more materials selected from the group consisting of: an electrically-conductive material, a magnetic material, and a magnetic electrically-conductive material.

14. The apparatus according to claim 1, wherein the heating material comprises a metal or a metal alloy.

15. The apparatus according to claim 1, wherein the heating material comprises one or more materials selected from the group consisting of: aluminum, gold, iron, nickel, cobalt, conductive carbon, graphite, plain-carbon steel, stainless steel, ferritic stainless steel, copper, and bronze.

16. The apparatus of claim 1, wherein a first section of the inner wall is made of a first material and a second section of the inner wall is made of a second material that is different from the first material.

17. The apparatus of claim 1, wherein the apparatus is for heating non-liquid smokable material to volatilize at least one component of the smokable material without burning the smokable material.

18. The apparatus of claim 1, wherein the inner wall is connected to the outer wall at a first position on the inner wall and at a second position on the inner wall, wherein the inner wall comprises at least one deformable structure between the first position and the second position, and wherein the at least one deformable structure is for deforming to accommodate thermal expansion of a section of the inner wall between the first position and the second position during heating of the heating material.

19. The apparatus according to claim 1, wherein the heating material comprises a metallized layer of the inner wall.

20. The apparatus according to claim 19, wherein the inner wall comprises a support of at least one of a magnetically impermeable material or an electrically non-conductive material and the metallized layer is between the support and the insulation region.

21. The apparatus according to claim 19, wherein the inner wall comprises a support of at least one of a magnetically impermeable material or an electrically non-conductive material and the support is between the metallized layer and the insulation region.

22. An apparatus for heating smokable material to volatilize at least one component of the smokable material, the apparatus comprising:

- a heating zone for receiving at least a portion of an article comprising smokable material;
- a heating element comprising heating material that is heatable by penetration with a varying magnetic field to heat the heating zone;
- a thermal insulator comprising:
  - an outer wall,
  - an inner wall between the heating element and the outer wall, and
  - an insulation region bound by the inner wall and the outer wall, wherein the insulation region is evacuated to a lower pressure than an exterior of the insulating region, and wherein one or each of the inner wall and the outer wall is at least one of magnetically impermeable or electrically non-conductive; and
- a magnetic field generator for generating a varying magnetic field that penetrates the heating element in use.

23. The apparatus according to claim 22, wherein one or each of the outer wall and the inner wall is formed of glass.

24. The apparatus according to claim 22, wherein the heating element is connected to the inner wall by one or more deformable attachments.

25. Smokable material for use with the apparatus of claim 1.

26. A system for heating smokable material to volatilize at least one component of the smokable material, the system comprising:

- the apparatus according to claim 1; and
- the article comprising smokable material for locating at least partially in the heating zone of the apparatus.

27. A method of heating smokable material to volatilize at least one component of the smokable material, the method comprising:

- providing the apparatus according to claim 1;
- locating at least a portion of the article comprising smokable material in the heating zone of the apparatus; and
- penetrating the heating material of the apparatus with a varying magnetic field to heat the heating zone and the smokable material.

28. A thermal insulator for use in an apparatus for heating smokable material to volatilize at least one component of the smokable material, the thermal insulator comprising:

- an inner wall comprising heating material that is heatable by penetration with a varying magnetic field;
- an outer wall that is at least one of magnetically impermeable or electrically non-conductive; and
- an insulation region bound by the inner wall and the outer wall, wherein the insulation region is evacuated to a lower pressure than an exterior of the insulation region.

* * * * *